United States Patent
Babbellapati et al.

(10) Patent No.: US 11,240,855 B2
(45) Date of Patent: Feb. 1, 2022

(54) LOCAL AREA NETWORK CLIENT PARTICIPATION IN A NETWORK SLICE

(71) Applicant: QUALCOMM Incorporated, San Diego, CA (US)

(72) Inventors: Syam Krishna Babbellapati, Chennai (IN); Sitaramanjaneyulu Kanamarlapudi, San Diego, CA (US); Xiaolong Huang, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 16/740,608

(22) Filed: Jan. 13, 2020

(65) Prior Publication Data

US 2021/0219354 A1 Jul. 15, 2021

(51) Int. Cl.
| | |
|---|---|
| *H04W 76/11* | (2018.01) |
| *H04L 12/18* | (2006.01) |
| *H04W 28/02* | (2009.01) |
| *H04W 48/16* | (2009.01) |
| *H04W 84/12* | (2009.01) |

(52) U.S. Cl.
CPC .......... *H04W 76/11* (2018.02); *H04L 12/189* (2013.01); *H04W 28/0268* (2013.01); *H04W 48/16* (2013.01); *H04W 84/12* (2013.01)

(58) Field of Classification Search
CPC . H04W 76/11; H04W 28/0268; H04W 48/16; H04W 84/12; H04L 12/189
See application file for complete search history.

(56) References Cited

U.S. PATENT DOCUMENTS

| | | | | |
|---|---|---|---|---|
| 10,484,886 | B2* | 11/2019 | Griot | H04W 48/20 |
| 10,575,230 | B2* | 2/2020 | Wang | H04W 36/14 |
| 11,026,149 | B1* | 6/2021 | Goel | H04W 36/34 |
| 2016/0073327 | A1* | 3/2016 | Clougherty | H04W 48/04 |
| | | | | 370/254 |
| 2017/0367036 | A1* | 12/2017 | Chen | H04L 43/08 |
| 2018/0332523 | A1* | 11/2018 | Faccin | H04W 36/14 |
| 2019/0007899 | A1* | 1/2019 | Vrzic | H04W 72/12 |
| 2019/0037409 | A1* | 1/2019 | Wang | H04W 16/04 |
| 2019/0223093 | A1* | 7/2019 | Watfa | H04W 36/06 |
| 2019/0335330 | A1* | 10/2019 | Salkintzis | H04W 12/08 |

(Continued)

FOREIGN PATENT DOCUMENTS

| | | |
|---|---|---|
| CN | 107710832 A | 2/2018 |
| WO | WO-2018182604 A1 | 10/2018 |
| WO | WO-2019229492 A1 | 12/2019 |

OTHER PUBLICATIONS

International Search Report and Written Opinion—PCT/US2020/065448—ISA/EPO—dated Apr. 23, 2021.

*Primary Examiner* — Michael J Moore, Jr.
(74) *Attorney, Agent, or Firm* — Holland & Hart LLP

(57) ABSTRACT

This disclosure provides methods, devices and systems for transmitting, to one or more local area network clients of the device, a multicast message indicating an available network slice, receiving, from a first local area network client of the one or more local area network clients based on the multicast message, a request to access the available network slice, establishing, at the device based on receiving the request, a connection associated with the available network slice, and transmitting, to the first local area network client based on establishing the connection, a confirmation to access the available network slice.

30 Claims, 14 Drawing Sheets

(56) References Cited

U.S. PATENT DOCUMENTS

| | | | |
|---|---|---|---|
| 2019/0349838 A1* | 11/2019 | Futaki | H04W 36/08 |
| 2020/0008095 A1 | 1/2020 | Patil | |
| 2020/0037234 A1* | 1/2020 | Bulakci | H04W 76/27 |
| 2020/0053083 A1* | 2/2020 | Kunz | H04W 12/06 |
| 2020/0120721 A1* | 4/2020 | Lau | H04W 48/18 |
| 2020/0236528 A1* | 7/2020 | Lee | H04W 8/082 |
| 2020/0275356 A1* | 8/2020 | Forsman | H04L 41/0803 |
| 2021/0144619 A1* | 5/2021 | Prakash | H04W 48/00 |

* cited by examiner

LOCAL AREA NETWORK CLIENT PARTICIPATION IN A NETWORK SLICE

TECHNICAL FIELD

The following relates generally to wireless communication, and more specifically to the participation of local area network (LAN) clients in a network slice.

DESCRIPTION OF THE RELATED TECHNOLOGY

A wireless local area network (WLAN) may be formed by one or more access points (APs) that provide a shared wireless communication medium for use by a quantity of client devices also referred to as stations (STAs). Wireless communication systems are widely deployed to provide various types of communication content such as voice, video, packet data, messaging, broadcast, and so on. These systems may be multiple-access systems capable of supporting communication with multiple users by sharing available system resources (for example, time, frequency, power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. An AP periodically broadcasts beacon frames to enable any STAs within wireless range of the AP to establish or maintain a communication link with the WLAN. A wireless device may communicate with a network device bi-directionally. For example, in a WLAN, a STA may communicate with an associated AP via downlink and uplink communications. The downlink (or forward link) communication may refer to the communication link from the AP to the station, and the uplink (or reverse link) communication may refer to the communication link from the station to the AP. A system, such as a 5G system, may support multiple network slices serving multiple wireless devices. The network slices may be isolated end-to-end networks supporting different features for different applications for the wireless devices. However, STAs operating in a WLAN supported by an AP accessing NR systems lack the ability to request or use network slices.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes transmitting, to one or more local area network (LAN) clients of the device, a multicast message indicating an available network slice, receiving, from a first LAN client of the one or more LAN clients based on the multicast message, a request to access the available network slice, establishing, at the device based on receiving the request, a connection associated with the available network slice, and transmitting, to the first LAN client based on establishing the connection, a confirmation to access the available network slice.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to transmit, to one or more LAN clients of the device, a multicast message indicating an available network slice, receive, from a first LAN client of the one or more LAN clients based on the multicast message, a request to access the available network slice, establish, at the device based on receiving the request, a connection associated with the available network slice, and transmit, to the first LAN client based on establishing the connection, a confirmation to access the available network slice.

In some implementations, the methods and wireless communication devices may be configured to determine one or more data packets associated with the available network slice, and determine whether the one or more data packets satisfy a quality of service (QOS) threshold. In some implementations, establishing the connection associated with the available network slice may be based on determining that the one or more data packets satisfy the QOS threshold.

In some implementations, the methods and wireless communication devices may be configured to transmit, to a network device based on receiving the request, a second request to access the available network slice, and receive, from the network device, a confirmation to access the available network slice. In some implementations, establishing the connection associated with the available network slice may be based on receiving the confirmation from the network device. In some implementations, the confirmation transmitted to the first LAN client may be based on the confirmation received from the network device.

In some implementations, the methods and wireless communication devices may be configured to receive, from the first LAN client, a second request to create a new network slice, determine an approval status associated with the new network slice and transmit, to a network device based on determining the approval status, a third request to access the new network slice. In some implementations, the second request may be based on the multicast message.

In some implementations, the methods and wireless communication devices may be configured to receive, from the network device based on transmitting the third request, a confirmation to access the new network slice.

In some implementations, the methods and wireless communication devices may be configured to establish, at the device based on receiving the confirmation to access the new network slice, a second connection associated with the new network slice, and transmit, to the first LAN client based on establishing the second connection, the confirmation to access the new network slice.

In some implementations, the methods and wireless communication devices may be configured to receive, from the first LAN client, a second request to delete a second network slice. In some implementations, the second request may be based on the multicast message, and delete the second network slice based on receiving the second request.

In some implementations, the methods and wireless communication devices may be configured to receive, from the first LAN client, a second request to initialize an application using a first wireless area network, transmit, to a network device, the second request to initialize the application of the first LAN client using the first wireless area network, and receive, from the network device, information associated with a set of network slices based on transmitting the second request.

In some implementations, the methods and wireless communication devices may be configured to transmit the multicast message may be based on determining the available network slice.

In some implementations, the information includes one or more of network slice selection assistance information, configured slice selection assistance information, or allowed slice selection assistance information.

In some implementations, the methods and wireless communication devices may be configured to initiate, in response to transmitting the confirmation to access the available network slice, a new communication session with an application provider, and determine a QOS parameter associated with the available network slice based on initiating the new communication session.

In some implementations, the methods and wireless communication devices may be configured to receive, from the first LAN client, an indication of a released slice based on transmitting the confirmation to terminate the new communication session. In some implementations, the released slice includes the available network slice. In some implementations, the methods and wireless communication devices may be configured to transmit, to the first LAN client based on receiving the indication of the released slice, a message indicating a release of one or more resources associated with the released slice.

In some implementations, the methods and wireless communication devices may be configured to update the QOS parameter associated with the available network slice based on receiving the indication of the released slice. In some implementations, the multicast message includes one or more of a broadcast message, or a universal plug-and-play message.

One innovative aspect of the subject matter described in this disclosure can be implemented in a method for wireless communication. The method includes transmitting, to one or more LAN clients of the device, a multicast message indicating an available network slice, receiving, from a first LAN client of the one or more LAN clients based on the multicast message, an identifier associated with the available network slice, establishing, at the device based on a successful validation of the identifier, a connection associated with the available network slice, and transmitting, to the first LAN client based on establishing the connection, a confirmation to access the available network slice.

Another innovative aspect of the subject matter described in this disclosure can be implemented in a wireless communication device. The wireless communication device includes a at least one modem, at least one processor, at least one memory communicatively coupled with the at least one processor and storing processor-readable code that, when executed by the at least one processor in conjunction with the at least one modem, is configured to transmit, to one or more LAN clients of the device, a multicast message indicating an available network slice, receive, from a first LAN client of the one or more LAN clients based on the multicast message, an identifier associated with the available network slice, establish, at the device based on a successful validation of the identifier, a connection associated with the available network slice, and transmit, to the first LAN client based on establishing the connection, a confirmation to access the available network slice.

In some implementations, the methods and wireless communication devices may be configured to receive, from the first LAN client, a request to initialize an application at the first LAN client using a first wireless area network. In some implementations, receiving the identifier may be based on receiving the request. In some implementations, the methods and wireless communication devices may be configured to determine, in response to receiving the request, whether the identifier associated with the available network slice matches a second identifier. In some implementations, establishing the connection associated with the available network slice may be based on determining that the identifier associated with the available network slice matches the second identifier.

In some implementations, the methods and wireless communication devices may be configured to receive, from the first LAN client, a request associated with the available network slice, where receiving the identifier associated with the available network slice may be based on receiving the request. In some implementations, the methods and wireless communication devices may be configured to determine, in response to receiving the request, that the request may be associated with the available network slice. In some implementations, establishing the connection associated with the available network slice may be based on determining that the request may be associated with the available network slice.

In some implementations, the methods and wireless communication devices may be configured to determine one or more data packets associated with the available network slice, and determine whether the one or more data packets satisfy a QOS threshold. In some implementations, establishing the connection associated with the available network slice may be based on determining that the one or more data packets satisfy the QOS threshold.

In some implementations, the methods and wireless communication devices may be configured to transmit, to a network device based on receiving the identifier, a request to access the available network slice, and receive, from the network device, a confirmation to access the available network slice. In some implementations, establishing the connection associated with the available network slice may be based on receiving the confirmation from the network device. In some implementations, the confirmation transmitted to the first LAN client may be based on the confirmation received from the network device.

In some implementations, the methods and wireless communication devices may be configured to receive, from the first LAN client, a request to initialize an application using a first wireless area network, transmit, to a network device, the request to initialize the application of the first LAN client using the first wireless area network, and receive, from the network device, information associated with a set of network slices based on transmitting the request.

In some implementations, the methods and wireless communication devices may be configured to transmit the multicast message based on determining the available network slice.

In some implementations, the methods and wireless communication devices may be configured to initiate, in response to transmitting the confirmation to access the available network slice, a new communication session with an application provider, and determine a QOS parameter associated with the available network slice based on initiating the new communication session.

In some implementations, the methods and wireless communication devices may be configured to receive, from the first LAN client, an indication of a termination of the new communication session associated with the available network slice, and transmit, to the first LAN client, a confirmation to terminate the new communication session associated with the available network slice.

In some implementations, the methods and wireless communication devices may be configured to receive, from the first LAN client, an indication of a released slice based on transmitting the confirmation to terminate the new communication session, and transmit, to the first LAN client based on receiving the indication of the released slice, a message indicating a release of one or more resources associated with the released slice. In some implementations, the released slice includes the available network slice.

In some implementations, the methods and wireless communication devices may be configured to update the QOS parameter associated with the available network slice based on receiving the indication of the released slice.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
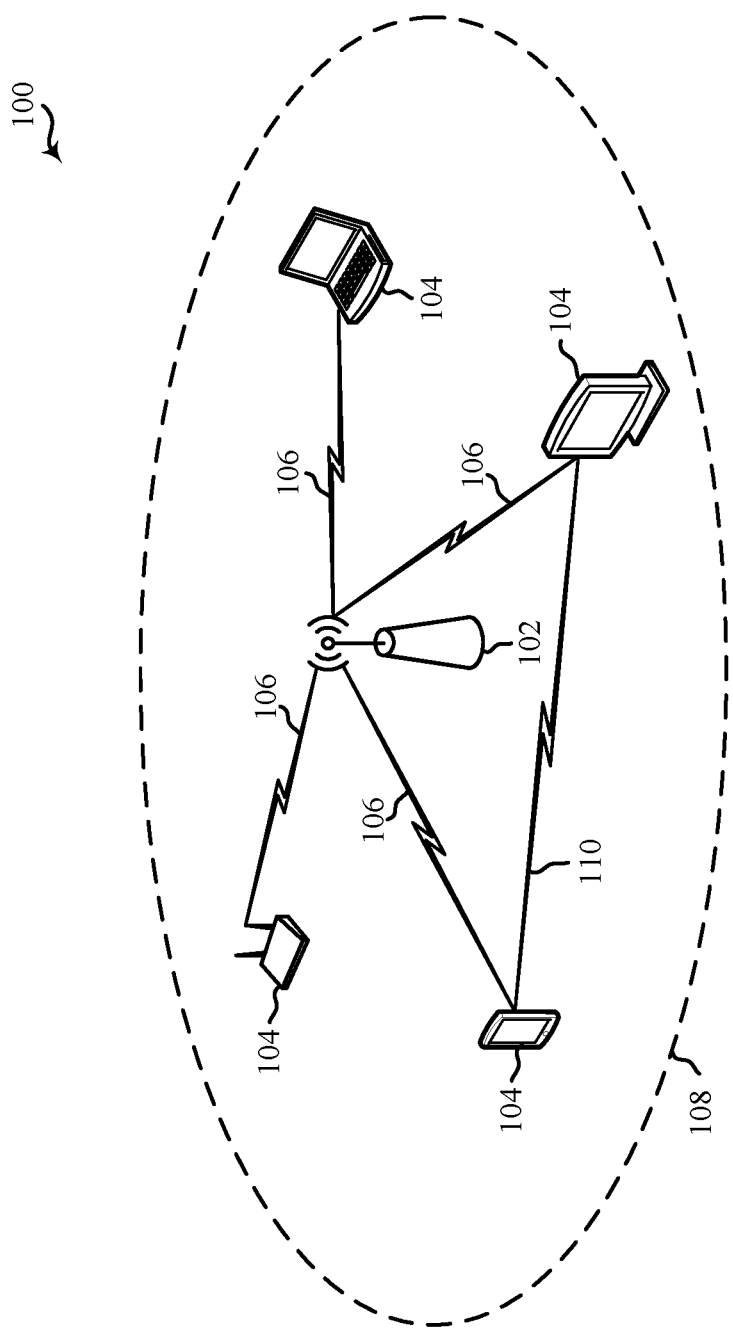
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (TOT) network.

Various implementations relate generally to techniques for local area network (LAN) client participation in a network slice. In some implementations, a customer premises equipment (CPE) having capabilities to access one or more systems, such as fifth generation (5G) wireless communication systems, may handle a network slice request from one or more LAN clients. In some examples, such a CPE may be referred to as a 5G-CPE. In some implementations, the 5G-CPE may enable LAN clients that are unaware of the available network slices to request and access the network slices. Additionally or alternatively, the 5G-CPE may enable LAN clients that are aware of the available network slices to request and access the network slices. In some examples in which the LAN clients and their applications are unaware of the available network slices, a 5G-CPE may determine available network slices (for example, using network slice selection assistance information, configured slice selection assistance information, or allowed slice selection assistance information, among other techniques), and may broadcast indications of the available network slices to the LAN clients. In some implementations, a LAN client may initiate an application session and the 5G-CPE may validate the user credentials associated with the initiation of the application session. In some implementations, the 5G-CPE may initiate the setup of a network slice on behalf of the LAN client upon successful validation of the user credentials.

In some examples in which the LAN clients and their applications are aware of the available network slices, the 5G-CPE may also determine available network slices and may also broadcast the available network slices to the LAN clients. In some implementations, upon receiving the message, a LAN client may request a creation of a network slice.

In some implementations, the LAN client may request to access the available network slice. In response to receiving such a request from the LAN client, the 5G-CPE may request a new network slice to be setup. In some implementations, the 5G-CPE may establish a connection (such as a packet data network) as part of a successful network slice setup. In some implementations, the 5G-CPE may route traffic related to the created or accessed network slice over the established connection (for example, over the packet data network).

Particular implementations of the subject matter described in this disclosure can be implemented to realize one or more of the following potential advantages. In some implementations, the described techniques can be used to enable LAN clients supported by a 5G-enabled CPE to request or use one or more network slices. According to one or more implementations, a 5G wireless communication system may support network slicing. Network slicing may provide for a creation of multiple virtual logical networks (which may be examples of network slices) over a physical infrastructure shared by multiple entities (such as multiple application providers or multiple operators). In some examples, the one or more network slices may support different features, or network function optimizations, or both. In some implementations, the techniques and other aspects described in this disclosure may enable one or more LAN clients to support ultra-low latency while communicating over a Wi-Fi interface.

Aspects of the disclosure are initially described in the context of a wireless communication system. Additional aspects are described with respect to a wireless communication system architecture and timing diagrams. Aspects of the disclosure are further illustrated by and described with reference to apparatus diagrams, system diagrams, and flowcharts that relate to the participation of LAN clients in a network slice.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a LAN client, a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A CPE having capabilities to access 5G wireless communication systems may include the AP 102. A single AP 102 and an associated set of STAs 104 may be referred to as a basic service set (BSS), which is managed by the respective AP 102. FIG. 1 additionally shows an example coverage area 106 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 108 (hereinafter also referred to as a "Wi-Fi link"), or to maintain a communication link 108, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 108.

To establish a communication link 108 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 108 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some examples, STAs 104 may form networks without APs 102 or other equipment other than the STAs 104 themselves. Some examples of such a network is an ad hoc network (or wireless ad hoc network). Ad hoc networks may alternatively be referred to as mesh networks or peer-to-peer (P2P) networks. In some examples, ad hoc networks may be implemented within a larger wireless network such as the WLAN 100. In such implementations, while the STAs 104 may be capable of communicating with each other through the AP 102 using communication links 108, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 108) according to the IEEE 802.11 family of wireless communication protocol standards (such as that defined by the IEEE 802.11-2016 specification or amendments thereof including, but not limited to, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of PHY protocol data units (PPDUs) (or physical layer convergence protocol (PLCP) PDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

As described above, the APs 102 and the STAs 104 can support multi-user (MU) communications; that is, concurrent transmissions from one device to each of multiple devices (for example, multiple simultaneous downlink (DL) communications from an AP 102 to corresponding STAs 104), or concurrent transmissions from multiple devices to a single device (for example, multiple simultaneous uplink (UL) transmissions from corresponding STAs 104 to an AP 102). To support the MU transmissions, the APs 102 and STAs 104 may utilize multi-user multiple-input, multiple-output (MU-MIMO) and multi-user orthogonal frequency division multiple access (MU-OFDMA) techniques.

In some implementations, the APs 102 and the STAs 104 can support the use of network slices, as described herein. For example, 5G wireless communication systems (such as wireless communication network 100) may support the creation of multiple network slices (which may be examples of virtual logical networks) over a physical infrastructure shared by multiple application providers. In some examples, the network slices may be isolated end-to-end networks supporting different features for different applications. As described with reference to FIG. 1, an AP 102 may, in some examples, be included in a 5G-enabled CPE (or 5G-CPE) and STAs may be referred to as LAN clients. In some examples, one or more aspects of the present disclosure enable a CPE or other wireless communication device to handle a network slice request from a LAN client (for example, a STA 104). In some examples, LAN clients of an AP 102 (such as an AP included in a 5G-CPE) and their applications may be unaware of the available network slices. In such examples, the AP 102 may handle an initiation of a network slice without the LAN clients being aware of the slice initiation. In some other examples, the LAN clients and their applications may be aware of the available network slices. In such examples, a LAN client may solicit a network slice initiation through the CPE (such as the 5G-CPE including the AP 102) after receiving messages on the slice availability from the AP 102.

Figure 2:
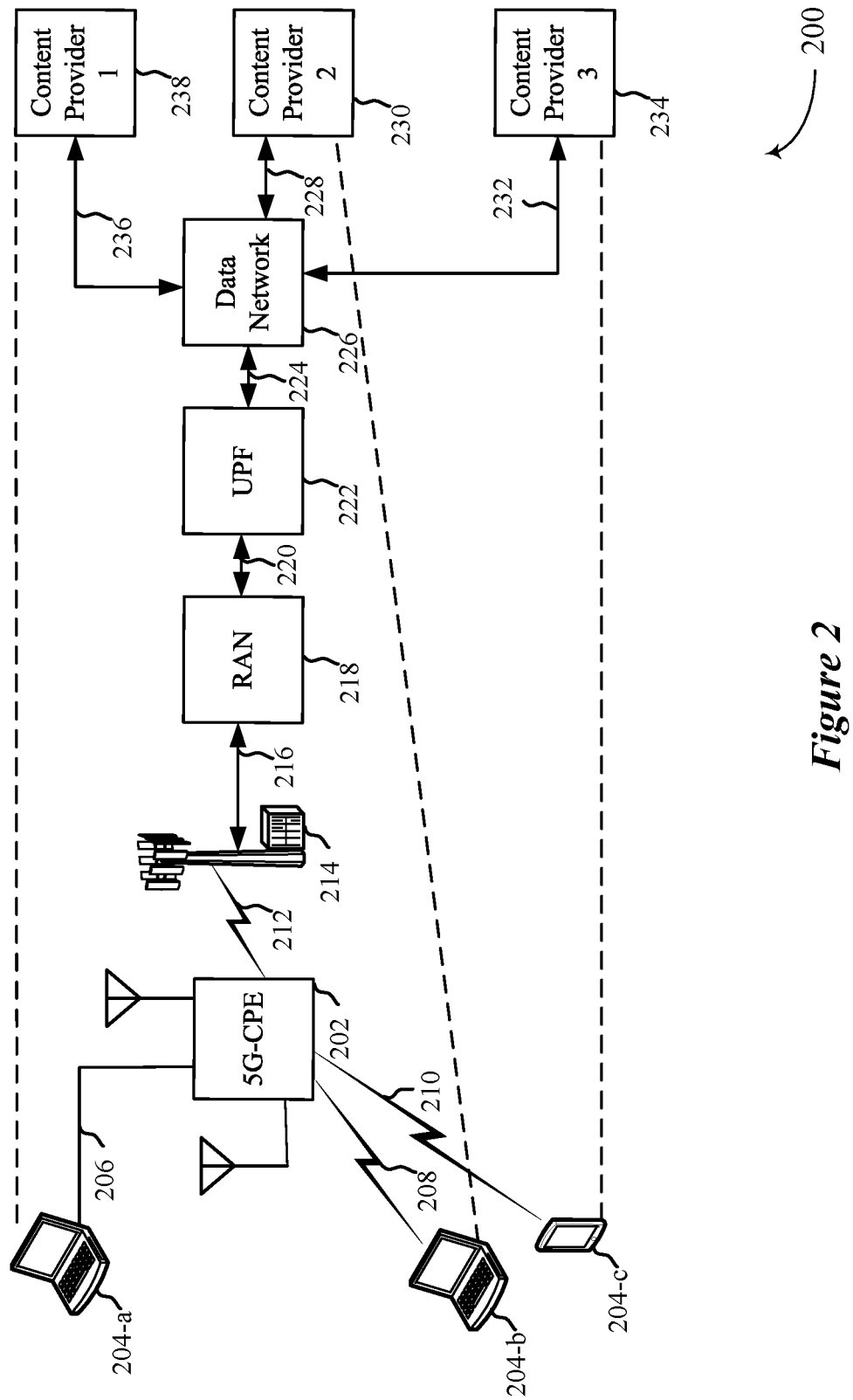
FIG. 2 shows a pictorial diagram of an example wireless communication network.

FIG. 2 shows a pictorial diagram of an example wireless communication network 200. The wireless communications network 200 may be an example of a wireless communication network 100 and may include an 5G-CPE 202 (such as a 5G-CPE including an AP) and UEs 204-*a*, 204-*b*, and 204-*c* (which may also be examples of STAs), which may be examples of the corresponding devices described with reference to FIG. 1. The 5G-CPE 202 may provide network coverage for a coverage area. The 5G-CPE 202 and the UEs 204-*a*, 204-*b*, and 204-*c* may communicate over one or more communication links. For example, the 5G-CPE 202 and the UE 204-*a* may communicate over a wired communication link 206 (such as Ethernet), the 5G-CPE 202 and the UE 204-*b* may communicate over a wireless communication link 208 (such as Wi-Fi), and the 5G-CPE 202 and the UE 204-*c* may communicate over a wireless communication link 210 (such as a Wi-Fi communication link or a 5G communication link). The UEs 204-*a*, 204-*b*, and 204-*c* in conjunction with the 5G-CPE 202 may utilize one or more network slices to improve communication efficiency and to obtain a power advantage for communications, among other advantages.

In some examples, the 5G-CPE 202 may communicate with a base station 214 using a wireless communication link 212. The base station 214 may be a base station providing or accessing a 5G or NR network. The base station 214 may communicate with a radio access network (RAN) 218 using a wired or wireless communication link 216. As shown with reference to FIG. 2, the RAN 218 may communicate with a user plane function (UPF) 222 using communication link 220. The UPF 222 may communicate with a data network 226 using communication link 224. In some implementations, the data network 226 may be configured to access multiple content providers (or application providers). The data network 226 may communicate with a first content provider (Content Provider 1) using communication link 236. Additionally or alternatively, the data network 226 may communicate with a second content provider (Content Provider 2) using communication link 228, and may communicate with a third content provider (Content Provider 2) using communication link 232. The wireless communication network 200 is configured to perform one or more of the processes 1200, 1300, and 1400 described above with reference to FIGS. 12, 13, and 14, respectively. In some implementations, one or more of the devices in wireless communication network 200 can be an example implementation of the devices described herein with reference to FIGS. 1, 3, and 4.

According to some implementations, the wireless communication network 200 may support network slicing. In some examples, wireless communication network (such as the wireless communication network 200) may support 5G technology. The 5G communication network may be configured to offer different services to applications based on network slices. In some implementations, a network slice can be described as an end-to-end tunnel between an application hosted on a UE (such as UEs 204-a, 204-b, and 204-c) and the application-provider. The network slicing may be supported by the 5G core network and the RAN (such as the base station 214 in conjunction with the RAN 218). However, solutions for supporting a network slice (with the ability of a user-application requesting or using a network slice) is unavailable for LAN clients (such as UEs or STAs). More specifically, for example, LAN clients supported by a 5G-enabled CPE conventionally lack the ability to request or use network slices. Additionally, without the ability to access the network slices, it is challenging for a 5G-CPE (such as a home router for wireless broadband service using a 5G WAN/5G WLAN/5G network and Wi-Fi/Ethernet) to support ultra-low latency while operating using a Wi-Fi interface.

In some examples, the current network slicing types may be categorized according to Table 1.

TABLE 1

| Slice/Service type | SST value | Characteristics |
|---|---|---|
| eMBB | 1 | Network slice suitable for the handling of 5G enhanced Mobile Broadband. |
| URLLC | 2 | Network slice suitable for the handling of ultra-reliable low latency communications. |
| MioT | 3 | Network slice suitable for the handling of massive IoT. |

As shown in Table 1, each of the network slice type or service type may be associated with different quality of service (QOS) requirements or parameters including latency and performance parameters. In some examples, for the URLLC service type, the network slice provides for a user plane latency value of 0.5 ms for uplink communications and 0.5 ms for downlink communications. Furthermore, for the URLLC service type, the latency value may support the use of the next generation access technologies as a wireless transport technology that can be used within the next generation access architecture. In some examples, a reliability key performance indicator may provide a latency value with an associated reliability parameter. In some examples, the latency value may be an average value that does not have an associated high reliability parameter. In some examples, for the eMBB service type, a network slice provides for a user plane latency value of 4 ms for uplink communications and 4 ms for downlink communications. In some examples, a latency value for the eMBB service type may be based on all typical delays associated with the transfer of data packets (for example, an applicable procedural delay when resources are not pre-allocated, an average hybrid automatic repeat request retransmission delay, and delays associated with the network architecture). In some implementations, for the URLLC service type, the QOS parameter associated with the latency may have a higher threshold (0.5 ms for uplink communications and 0.5 ms for downlink communications). To support the URLLC service type, a conventional wireless communication network may support the higher threshold for the QOS parameter associated with the latency between the 5G core network (such as the RAN) and the UE.

In addition to the network slice type or service type, one or more operators can define a slice type or service type with the characteristics associated with the operators. Specifically, existing wireless communication networks allow for customized network slices to be created and serviced. Additionally or alternatively, existing wireless communication networks that support network slicing may account for end-to-end latencies. In some examples, end-to-end latencies may include the application latencies on a UE. In some examples, the application latencies for different applications may be 3-5 ms for the URLLC service type. In some implementations, it may be important to account for application latency as part of an overall end-to-end latency (for example, an end-to-end latency between an application and a 5G core network). In an example of a live audio performance that may be associated with an application and a 5G core network, there may exist a deterministic latency to receive the live audio over a wireless communication network and an application latency associated with processing a live audio at a UE.

In one or more implementations, the wireless communication network 200 may enable the use of network slices by LAN clients (such as UEs 204-a, 204-b, and 204-c). Specifically, the wireless communication network 200 may handle a network slice request from one or more of the LAN clients. In some aspects, the wireless communication network 200 may handle the access and creation of network slices in two scenarios. In an example of a first scenario, the LAN clients (for example, UE 204-a) and their applications may be unaware of the available network slices. In such an example, the 5G-CPE 202 may handle an initiation of a network slice without one or more of the LAN clients being aware of a slice initiation. In an example of a second scenario, the LAN clients (for example, UEs 204-b and 204-c) and their applications may be aware of the available network slices. In such an example, the LAN clients may solicit a network slice initiation through the 5G-CPE 202 after receiving broadcast or multicast messages indicating that network slices are available.

As shown with reference to FIG. 2, the UEs 204-a, 204-b, and 204-c may host different applications. For example, an application hosted in the UE 204-a may be associated with the content provider 238 (Content Provider 1). Likewise, an application hosted in the UE 204-b may be associated with the content provider 230 (Content Provider 2) and an application hosted in the UE 204-*c* may be associated with the content provider 234 (Content Provider 3). According to some implementations, the UEs 204-*a*, 204-*b*, and 204-*c* may utilize different network slices to access different client applications. In some examples, the wireless communication network 200 supports signaling between the 5G-CPE 202 and the LAN clients (for example, the UEs 204-*a*, 204-*b*, and 204-*c*) to enable the use of network slices by the LAN clients. With the framework described with reference to FIG. 2, the LAN clients may benefit from requesting and accessing network slices from a 5G core network.

Figure 3:
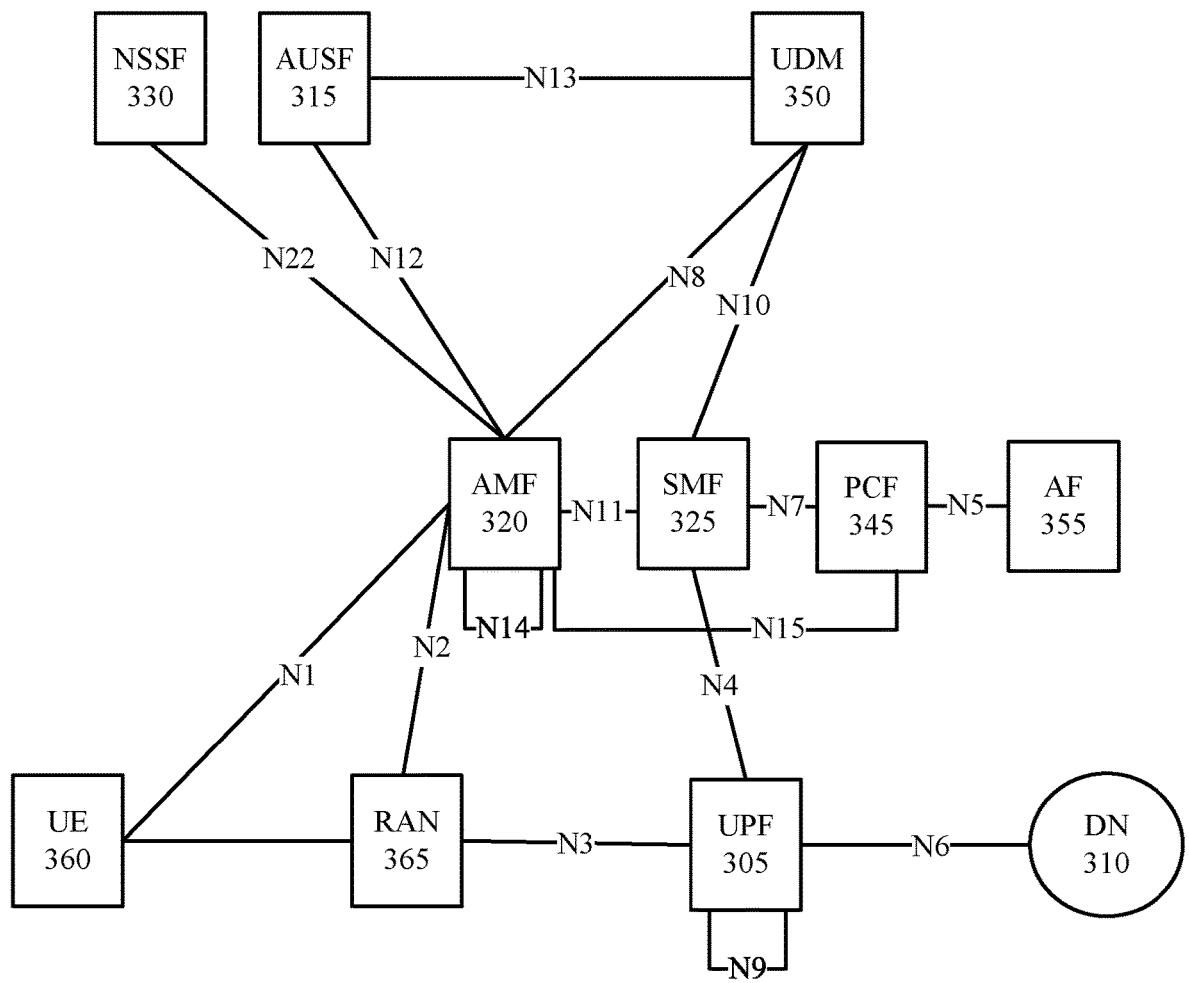
FIG. 3 illustrates an example of a wireless communication system architecture according to some implementations.

FIG. 3 illustrates an example of a wireless communication system architecture 300 according to some implementations. The wireless communication system architecture 300 may include a UE 360, a RAN 365, an UPF 305, a data network 310, an authentication server function (AUSF) 315, an access and mobility management function (AMF) 320, a session management function (SMF) 325, a network slice selection function (NSSF) 330, a PCF 345, a unified data management (UDM) 350, and an application function (AF) 355. In addition, the wireless communication system architecture 300 may include other functions or entities not displayed with reference to FIG. 3 or may not include one or more of the functions or entities shown.

As shown with reference to FIG. 3, the wireless communication system architecture 300 may support LAN clients (such as one or more UEs 360) to participate in a network slice. Specifically, the wireless communication system architecture 300 support the use of network slices to support additional features and network function optimizations. For example, a network slice defined within a public land mobile network (PLMN) may include the core network control plane and the user plane network functions. Network slices may differ for different supported features and different network optimizations. In some examples, an operator may deploy multiple network slice instances delivering the same features but for different groups of UEs (for example, as the different groups of UEs may deliver a different committed service or because the different groups of UEs may be dedicated to a customer). A single UE 360 can simultaneously be served by one or more network slice instances. In some examples, a threshold associated with a number of concurrent slices be set to eight slices, meaning that a single UE 360 may be served by at most eight network slices at a time. The AMF 320 instance serving the UE 360 may logically belong to each of the network slice instances serving the UE 360 (for example, the AMF 320 instance may be common to the network slice instances serving a UE 360).

The selection of the set of network slice instances for a UE 360 (where each of the network slice instances corresponding to network slice selection assistance information, may be triggered by a first contacted AMF as part of one or more procedures, such as a registration procedure. In some examples, the selection of the set of network slice instances may be triggered by interacting with the NSSF 330, and may lead to a change of the AMF 320. Network slice selection assistance information may be used to uniquely determine a network slice. SMF discovery and selection within the selected network slice instance may be initiated by the AMF 320 in response to receiving a session management message from the UE 360. The session management message may include a message to establish a PDU session. In some implementations, different network slice instances may not share a PDU session, though different slices may have slice-specific PDU sessions using the same data network name.

As described above, network slice selection assistance information may be used to determine a network slice and may include a slice or service type (SST) and a slice differentiator (SD), among other examples. The SST may refer to the expected network slice behavior in terms of features and services, and the SD may be optional information that complements the SST to differentiate amongst multiple network slices of the same SST. The selection of a network slice instance serving a UE 360 and the core network control plane and user plane network functions corresponding to the network slice instance may be the responsibility of a 5G core network. The RAN 365 may use requested network slice selection assistance information in access stratum signaling to handle the UE control plane connection before the 5GC informs the RAN 365 of the allowed network slice selection assistance information. When a UE 360 is successfully registered, the 5G core network may inform the RAN 105 by providing the allowed network slice selection assistance information for the control plane aspects. When a PDU Session is established using a specific network slice instance, the 5G core network may provide to the RAN 365, network slice selection assistance information corresponding to the network slice instance to enable the RAN 365 to perform access specific functions.

In some implementations, the establishment of user plane connectivity to a data network via a network slice instance may include selecting an AMF 320 that supports the network slices and establishing one or more PDU sessions to the data network 310 via the network slice instances. When the AMF 320 is selected, the AMF 320 may query the UDM 350 to retrieve UE subscription information including the subscribed network slice selection assistance information.

In some examples, the AMF 320 may be allowed to determine whether it can serve the UE 360 based on a configuration associated with the UE 360. For example, the AMF 320 may be allowed to determine that it can serve the UE 360 based on satisfying at least one parameter associated with the configuration. In addition, the AMF 320 may query the NSSF 330 with requested network slice selection assistance information, an identifier of a subscription permanent identifier (SUPI), location information, and an indication of the access technology used by the UE 360. Based on such information, a local configuration, and other locally available information including RAN capabilities in a registration area, the NSSF 330 may perform one or more operations to select the network slice instances to serve the UE 360. Alternatively, the NSSF 330 may defer the selection of the network slice instance until at least one network slice instance in the registration area are able to serve the UE 360.

In some examples, the set of network slices for a UE 360 may be dynamically changed while the UE 360 is registered with a network. In such examples, the changing of the set of network slices for the UE 360 may be initiated by the network or the UE under various conditions. Based on the operational or deployment plans of an operator, multiple network slice instances associated with common network slice selection assistance information may be deployed in the same registration areas or in different registration areas. In some examples, the registration area allocated by the AMF 320 to the UE 360 may have homogenous support for network slices. When a network slice used for one or multiple protocol data unit sessions becomes no longer available for a UE 360 under the same AMF 320, the AMF 320 may indicate to the SMF 325 to autonomously release the UE 360. In some examples, the establishment of a protocol data unit session in a network slice to the data network 310 may allow data transmission in a network slice.

Figure 4:
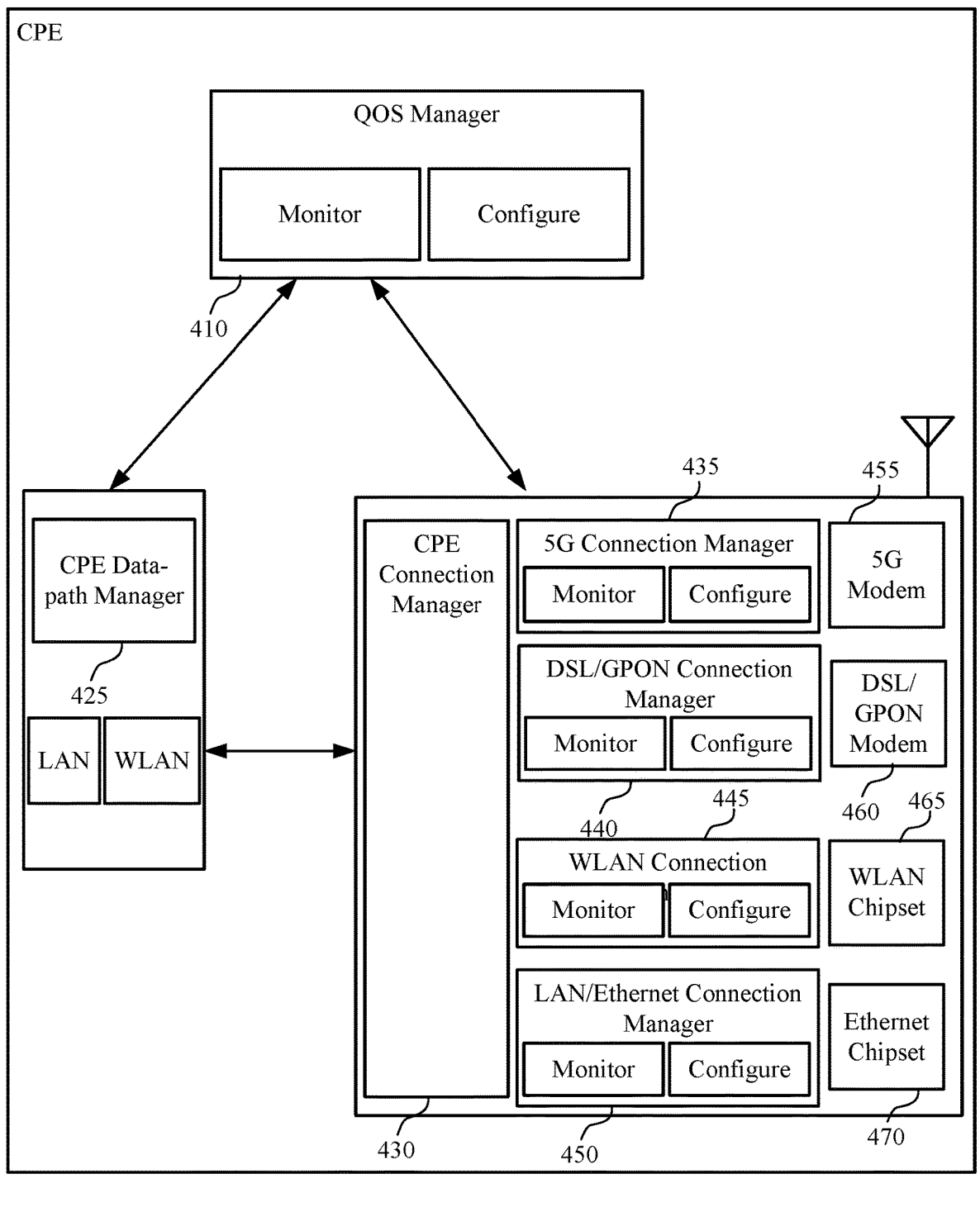
FIG. 4 shows a block diagram of an example wireless communication device that supports techniques for LAN clients participation in a network slice according to some implementations.

FIG. 4 shows a block diagram of an example wireless communication device 400 that supports techniques for LAN clients participation in a network slice according to some implementations. In some implementations, the wireless communication device 400 is configured to perform one or more of the processes 1200, 1300, and 1400 described above with reference to FIGS. 12, 13, and 14, respectively. In some implementations, the wireless communication device 400 can be an example implementation of a wireless communication device described herein with reference to FIG. 8 or a wireless communication device described herein with reference to FIG. 9. For example, the wireless communication device 400 can be a chip, SoC, chipset, package or device that includes at least one processor, a Wi-Fi (IEEE 802.11) modem, and a cellular modem. In some implementations, the wireless communication device 400 can be a CPE or a device for use in a CPE (as such, the wireless communication device 400 may hereinafter be referred to as CPE 400). In some implementations, the CPE 400 can be, or can include, an AP (such as AP 102) for serving one or more WLANs such as using a Wi-Fi network or a 5G network.

The wireless communication device 400 (or CPE 400) includes a QOS manager 410, a CPE data-path manager 425, a CPE connection manager 430, a 5G connection manager 435, a digital subscriber line (DSL)/gigabit passive optical network (GPON) connection manager 440, a WLAN connection manager 445, a LAN or Ethernet connection manager 450, a 5G modem 455, a DSL/GPON modem 460, a WLAN chipset 465, and an Ethernet chipset 470. Portions of one or more of the modules 410, 425, 430, 435, 440, 445, 450, 455, 460, 465, and 470 may be implemented at least in part in hardware or firmware. In some implementations, at least some of the modules 410, 425, 430, 435, 440, 445, 450, 455, 460, 465, and 470 are implemented at least in part as software stored in a memory. For example, portions of one or more of the modules 410, 425, 430, 435, 440, 445, 450, 455, 460, 465, and 470 can be implemented as non-transitory instructions (or "code") executable by a processor to perform the functions or operations of the respective module.

The CPE connection manager 430 may be configured to setup connections between the LAN and wide area network (WAN) interfaces. As depicted with reference to FIG. 4, the WAN interferes may include a 5G WAN interface and a DSL/GPON WAN interface. In some implementations, the 5G WAN and the DSL/GPON WAN may be referred to as hybrid WANs. In some examples, such hybrid WANs may be used by the CPE 400. In some implementations, the CPE connection manager 430 may be configured to perform traffic switching and traffic steering. Additionally or alternatively, the CPE connection manager 430 may be configured to setup one or more channels across multiple LAN and WAN interfaces. In some implementations, the CPE connection manager 430 may be configured to setup or terminate (for example, tear down) connections with the network or with one or more WLAN clients (such as STA 104). According to some implementations, the CPE connection manager 430 in conjunction with the QOS manager 410, may setup or terminate one or more connections (as further described with reference to FIGS. 5 and 6).

The QOS manager 410 may be configured to determine whether new QOS flows may be admitted into an existing flow. For example, the QOS manager 410 may be configured to control admission of new QOS flows and sustain the committed QOS flows. In some examples, the QOS manager 410 may be configured to determine one or more QOS parameters associated with a 5G network (such as a 5G WAN or a 5G WLAN). In such implementations, the QOS manager 410 may be configured to coordinate the QOS flows on the LAN (such as Ethernet and Wi-Fi) as well as the 5G WAN or the 5G WLAN (such as DSL/GPON). In some examples, QOS manager 410 may be configured to coordinate the QOS flows using one or more committed QOS parameters. In some implementations, the QOS manager 410 may be configured to determine resource allocations (such as a buffer resource allocation) within CPE 400. In some example, the QOS manager 410 may be configured to determine random access memory (RAM) supported by various interfaces and data rates supported by various interfaces. In some examples, the QOS manager 410 may be configured to optimize the resources within the CPE 400. In some examples, the QOS manager 410 may be configured to tag the resources to multiple states (such as green, yellow, and red) on a periodic basis to facilitate decision making during an admission of a QOS flow associated with a session or a network slice. Additionally or alternatively, the QOS manager 410 may be configured to tag the resources to multiple states to effectively sustain a session or a network slice.

As shown with reference to FIG. 4, the CPE connection manager 430, the QOS manager 410, and the CPE data-path manager 425 may be coupled with each other, and may be configured to transmit and receive one or more commands and notifications. In some implementations, the CPE data-path manager 425 may be configured to handle traffic, including traffic switching, maintaining traffic statistics, and transmitting and receiving traffic on various interfaces. In some examples, the CPE data-path manager 425 may be configured to manage traffic received or transmitted using a combination of the 5G connection manager 435, the DSL/GPON connection manager 440, the WLAN connection manager 445, the LAN or Ethernet connection manager 450, the 5G modem 455, the DSL/GPON modem 460, the WLAN chipset 465, and the Ethernet chipset 470. In some example, the 5G modem 455 may be coupled with a URSP daemon (not shown). The URSP daemon may be configured to manage a route selection policy for a UE. In some examples, the URSP daemon may be configured to receive one or more updates to the route selections resulting from network changes including changes initiated by a Policy and Charging Framework (PCF). In some examples, the URSP daemon may be configured to receive one or more updates at a run-time. Additionally or alternatively, the URSP daemon may be configured to track all the slice selection assistance information (such as network slice selection assistance information, configured slice selection assistance information, or allowed slice selection assistance information).

Figure 5:
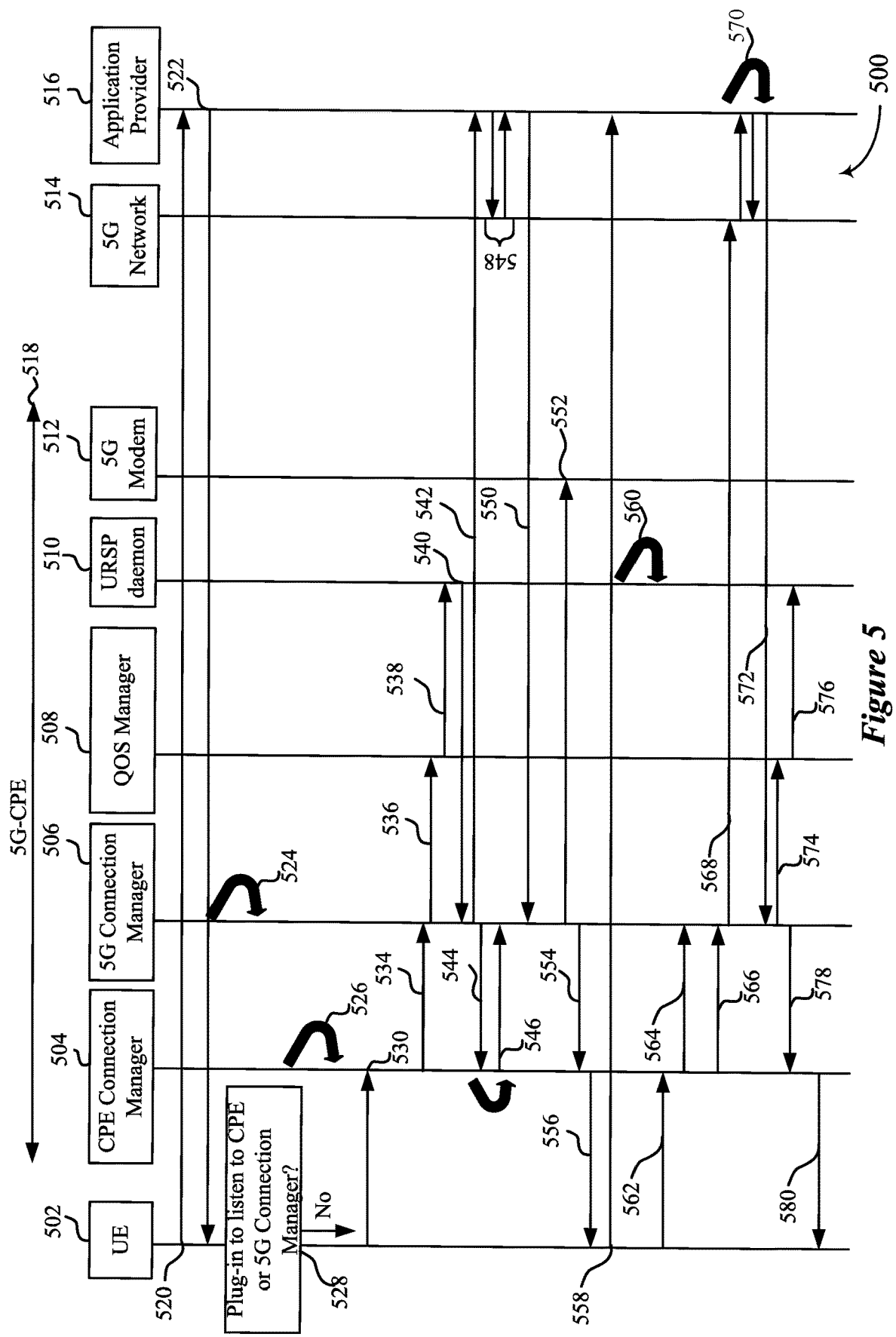
FIG. 5 illustrates an example timing diagram illustrating an example process for local area network (LAN) clients to participate in a network slice according to some implementations.

FIG. 5 shows an example timing diagram 500 illustrating an example process for LAN clients to participate in a network slice according to some implementations. The timing diagram 500 may be implemented by a combination of a UE 502 (such as STA 104 or a LAN client), a 5G-CPE 518 (such as AP 102), a wireless communication network (such as 5G network 514), and an application provider 516. The UE 502 and the 5G-CPE 518 may be examples of the corresponding devices described with reference to FIGS. 1 and 2. The 5G-CPE 518 may include a CPE connection manager 504, a 5G connection manager 506, a QOS manager 508, a URSP daemon 510, and a 5G modem 512. Each of the components included in the 5G-CPE 518 may be examples of the corresponding devices described with reference to FIG. 4. Although not depicted in FIG. 5, the UE 502 may include or host one or more applications.

In some implementations, the 5G-CPE 518 may be an example of an AP having a capability to access the 5G network (such as 5G network 514). The UE 502 and the 5G-CPE 518 may access network slices (such as network slices available in a 5G network) to improve communication efficiency and end-to-end latency. In the example of FIG. 5, the UE 502 may not be aware of one or more network slices supported by the 5G network 514. Alternative examples of the timing diagram 500 may be implemented, in which some steps may be performed in a different order than described, some steps may be added, or some steps may not be performed at all. In some implementations, steps may include additional features not described below.

At 520, the UE 502 may initialize an application (such as an application hosted on the UE 502). In some implementations the UE 502 may transmit, to the 5G-CPE 518, a request to initialize the application using a first wireless area network. In some examples, the first wireless area network may include a default packet data network. Additionally or alternatively, the first area network may include a WAN. In some implementations, upon receiving the request from the UE 502, the 5G-CPE 518 may transmit another request (such as a second request) to a network device (such as to the application provider 516) to request the application provider 516 to initialize the application of the UE 502 using the default packet data network or the default WAN. In some examples, the 5G-CPE 518 may receive information associated with network slices based on the request at 520.

At 522, the UE 502 may receive an indication of a successful initialization of the application hosted by the UE 502. In some examples, the 5G-CPE 518 may receive the indication from the application provider 516, and the 5G-CPE 518 may forward the information (or a message based on the received information) to the UE 502.

At 524, the 5G-CPE 518 may analyze (one time or iteratively) the received information to determine an available network slice from a set of network slices supported by the 5G network 514. In some implementations, the URSP daemon 510 may receive the network slice selection assistance information and may forward the network slice selection assistance information to the 5G connection manager 506. The 5G connection manager 506 may analyze the network slice selection assistance information and determine the available network slices.

At 526, the 5G-CPE 518 may populate the available network slices on a web interface for display to the UE 502. In some implementations, the 5G connection manager 506 may indicate the available network slice to the CPE connection manager 504, and the CPE connection manager 504 populate the available network slices. For example, the CPE connection manager 504 may program one or more rules and may generate a message to be transmitted to the UE 502.

In some implementations, the 5G-CPE 518 may provide an option to a user operating the UE 502 to provide credentials for accessing or establishing a network slice. In some example implementations, the message may be a multicast message or a broadcast message.

At 528, the UE 502 may determine whether there is a plug-in available to communicate with the 5G-CPE 518. In some implementations the UE 502 may determine that the plug-in to communicate with the 5G-CPE 518 (such as a plug-in to communicate with the CPE connection manager 504 or the 5G connection manager 506) is not available at the UE 502.

At 530, the UE 502 may transmit one or more credentials (such as one or more identifiers) to the 5G-CPE 518. If the user of the 5G-CPE 518 (for example, the UE 502 or a user operating the UE 502) provides the credentials for accessing the available network slices, then the 5G-CPE 518 may program one or more rules in the CPE connection manager 504 to filter requests associated with configured services or configured network slices. The rules may filter the request and may forward the requests to the CPE connection manager 504.

In some implementations, the 5G-CPE 518 may determine that an application on the UE 502 has initiated an application session (for example, using domain name system or deep packet inspection or both). The 5G-CPE 518 may be configured to track the request and share the request with the CPE connection manager 504. The CPE connection manager 504 may then request validation of the credentials with 5G connection manager 506 to determine whether the provided credentials match one or more pre-configured credentials. In an example in which the credentials do not match, the CPE connection manager 504 may allocate the data flow (such as the data flow associated with the initiated application session) to a default packet data network.

At 534, the CPE connection manager 504 may validate the credentials or identifiers received at 530, and the CPE connection manager 504 may transmit a request including the identifier to the 5G connection manager 506.

At 536, the 5G connection manager 506 may transmit a request for an available network slice or a new network slice to the QOS manager 508. For example, the 5G connection manager 506 may transmit the request to determine approval for establishing the new network slice. The QOS manager 508 may determine one or more data packets associated with the available network slice and may further determine whether the one or more data packets satisfy a QOS threshold. In order to determine the QOS threshold, the QOS manager 508 may transmit a request to the URSP daemon 510 at 538.

In some implementations, the QOS manager 508 may determine whether a data flow associated with an available network slice or a new network slice can be admitted into a data queue, based on a policy associated with the available network slice. Additionally or alternatively, the QOS manager 508 may determine whether one or more data packets associated with a network slice satisfy the QOS threshold. At 540, the 5G connection manager 506 may receive an approval from the URSP daemon 510 indicating that the one or more data packets satisfy the QOS threshold.

Upon receiving the approval, the 5G connection manager 506 may transmit a request at 542 to setup a network slice (such as an available network slice or a new network slice) to the application provider 516. In some implementations, at 544, the 5G connection manager 506 may transmit one or more requests (such as iterative requests) to the CPE connection manager 504. In some implementations, a request transmitted to the CPE connection manager 504 may include a request to setup a network slice. In response to the request received by the CPE connection manager 504, the CPE connection manager 504 may transmit at 546 a confirmation of a successful setup of the network slice.

In some examples, at 548, the 5G network and the application provider may setup a network slice. At 550, the 5G connection manager 506 may receive a confirmation to access an available network slice, and at 552, the 5G connection manager 506 may establish a connection associated with the available network slice.

At 554, the 5G connection manager 506 may transmit an indication of a successful setup of a network slice to the CPE connection manager 504. At 556, the CPE connection manager 504 may transmit, to the UE 502, a confirmation to access the available network slice. At 558, the UE 502 may map a data session to a new packet data network. In some implementations, the 5G-CPE 518 may route traffic related to the established network slice over the new packet data network. At 560, the 5G-CPE 518 (at the URSP daemon 510) may be configured to auto-learn and setup one or more QOS rules or parameters associated with the established or accessed network slice.

At 562, the UE 502 may transmit, to the CPE connection manager 504, an indication to close the communication session with the one or more other devices. At 564, the CPE connection manager 504 may transmit the indication to the 5G connection manager 506.

At 566, the 5G-CPE 518 (at the CPE connection manager 504) may receive an indication of a released network slice from the UE 502. For example, the UE 502 may release a network slice in response to closing the communication session, and may transmit the indication of the released network slice to the 5G-CPE 518. In some examples, the released network slice may include the available network slice. At 568, the CPE connection manager 504, in conjunction with the 5G network 514, may terminate the packet data network (or connection) associated with the available network slice. At 570, the 5G network 514, in conjunction with the application provider 516, may confirm the termination of the packet data network using an iterative process.

At 572, the 5G network 514 may transmit to the 5G connection manager 506 an indication of a successful termination of the packet data network. At 574, the 5G connection manager 506 may transmit a message to release network slice resources (such as frequency resources and time resources) to the QOS manager 608. At 576, upon receiving the message, the QOS manager 508 may update the QOS parameter associated with the released network slice.

At 578, the 5G connection manager 506 may transmit a message to the CPE connection manager 504 indicating a release of one or more resources associated with the released network slice. At 580, the CPE connection manager 504 may transmit, to the UE 502, a message indicating a release of one or more resources associated with the released network slice.

Figure 6:
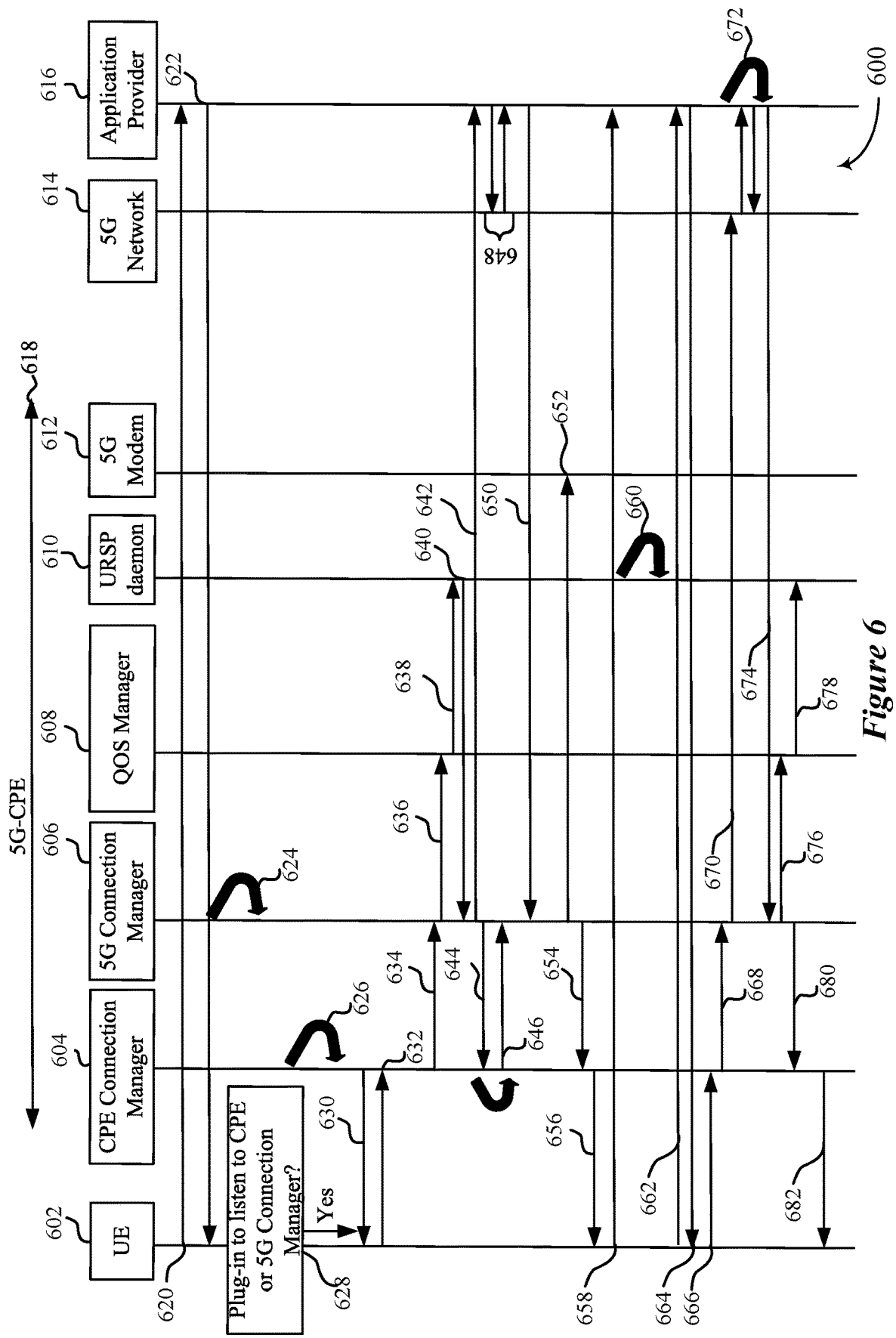
FIG. 6 illustrates an example timing diagram illustrating an example process for LAN clients to participate in a network slice according to some implementations.

FIG. 6 shows an example timing diagram 600 illustrating an example process for LAN clients to participate in a network slice according to some implementations. The timing diagram 600 may be associated with a combination of a UE 602 (such as STA 104 or a LAN client), a 5G-CPE 618 (such as AP 102), a wireless communication network (such as 5G network 614), and an application provider 616. The UE 602 and the 5G-CPE 618 may be examples of the corresponding devices described with reference to FIGS. 1 and 2. The 5G-CPE 618 may include a CPE connection manager 604, a 5G connection manager 606, a QOS manager 608, a URSP daemon 610, and a 5G modem 612. Each of the components included in the 5G-CPE 618 may be examples of the corresponding devices described with reference to FIG. 4. Although not depicted in FIG. 6, the UE 602 may include or host one or more applications.

In some implementations, the 5G-CPE 618 may be an example of an AP having a capability to access the 5G network 614. The UE 602 and the 5G-CPE 618 may access network slices (such as network slices available in a 5G network) to improve communication efficiency and end-to-end latency. In the example of FIG. 6, the UE 602 may be aware of one or more network slices supported by the 5G network 614. Alternative examples of the timing diagram 600 may be implemented, in which some steps may be performed in a different order than described, some steps may be added, or some steps may not be performed at all. In some implementations, steps may include additional features not described below.

At 620, the UE 602 may initialize an application (such as an application hosted on the UE 602). As part of the initialization, the UE 602 may transmit, to the 5G-CPE 618, a request to initialize the application using a first wireless area network. In some implementations, the first wireless area network may include a default packet data network. Additionally or alternatively, the first area network may include a default WAN/WLAN. In some implementations, upon receiving the request from the UE 602, the 5G-CPE 618 may transmit another request (such as a second request) to a network device (such as to the application provider 616). In some examples, the 5G-CPE 618 may request the application provider 616 to initialize the application of the UE 602 using the default packet data network or the default WAN/WLAN. In some examples, the 5G-CPE 618 may receive information associated with a set of network slices based on transmitting the second request.

At 622, the UE 602 may receive an indication of a successful initialization of the application hosted at the UE 602. In some examples, the 5G-CPE 618 may receive the indication of the successful initialization of the application from the application provider 616, and the 5G-CPE 618 may forward the information (or a message based on the received information) to the LAN client 602.

At 624, the 5G-CPE 618 may analyze the received information to determine an available network slice from the set of network slices. In some implementations, the 5G-CPE 618 may receive at least one of network slice selection assistance information, configured slice selection assistance information, or allowed slice selection assistance information. In some examples, the URSP daemon 610 may receive the network slice selection assistance information. The 5G connection manager 606 may analyze the network slice selection assistance information and determine the available network slice. The 5G connection manager 606 may then indicate the available network slice to the CPE connection manager 604.

At 626, the 5G-CPE 618 may populate the available network slices (such as network slices obtained from the URSP daemon 610) on a web interface for display to the UE 602. The 5G-CPE 618 may provide an option to a user operating the UE 602 to provide credentials for accessing or establishing a network slice. In some examples, the CPE connection manager 604 may program one or more rules and may generate a message to be transmitted to the UE 602. In some example implementations, the message may be a multicast message or a broadcast message.

At 628, the UE 602 may determine whether there is a plug-in available to communicate with the 5G-CPE 618. In some implementations the UE 602 may identify a plug-in to communicate with the 5G-CPE 618 (such as a plug-in to communicate with the CPE connection manager 604 or the 5G connection manager 606).

At 630, the 5G-CPE 618 (such as the CPE connection manager 604) may transmit a messages, such as a multicast message or a broadcast message, indicating an available network slice. For example, the 5G-CPE 618 may transmit the multicast message or the broadcast message to one or more LAN clients served by the 5G-CPE 618 (such as the UE 602). In some examples, the multicast message or the broadcast message may be referred to as discovery messages. In some examples, the 5G-CPE 618 may broadcast one or more discovered or configured network slices (such as available network slices) to the UE 602 using a universal plug-and-play message or one or more other multicast messages.

At 632, the UE 602 may request to access the available network slice (such as the available network slice indicated in the multicast message or the broadcast message). For example, the CPE connection manager 604 may receive the request to access the available network slice from the UE 602. In some implementations, the request may be based on the multicast message or broadcast message transmitted at 630. In some examples, an application hosted on the UE 602 may use a universal plug-and-play message to request a creation of a network slice through the CPE Connection Manager 604.

At 634, the CPE connection manager 604 may transmit the request to access the available network slice to the 5G connection manager 606. In some implementations, the CPE connection manager 604 may determine that the received request (such as the request received from the UE 602) includes a request to create a new network slice. In such an example, the CPE connection manager 604 may forward the request to create the new network slice to the 5G connection manager 606.

At 636, the 5G connection manager 606 may transmit a request for an available network slice or a new network slice to the QOS manager 608. The QOS manager 608 may determine one or more data packets associated with the available network slice and may further determine whether the one or more data packets satisfy a QOS threshold. To determine the QOS threshold, the QOS manager 608 may transmit a request to the URSP daemon 610 at 638. In some implementations, the QOS manager 608 may determine whether a data flow associated with an available network slice or a new network slice can be admitted into a data queue. In some examples, the request transmitted to the URSP daemon 610 may include a request to check a policy associated with the available network slice. Additionally or alternatively, the QOS manager 608 may determine one or more data packets associated with the a new network slice and may determine whether the one or more data packets satisfy the QOS threshold. At 640, the 5G connection manager 606 may receive an approval from the URSP daemon 610 indicating that the one or more data packets (such as one or more data packets associated with the available network slice or one or more data packets associated with a new network slice) satisfy the QOS threshold.

Upon receiving the approval from the QOS manager 608, the 5G connection manager 606 may transmit a request at 624 to setup a network slice (such as an available network slice or a new network slice). As described with reference to FIG. 6, the 5G connection manager 606 may transmit the request to setup the network slice to the application provider 616. In some implementations, the CPE connection manager 604 may request a new network slice to be setup through the 5G connection manager 606. For example, at 644, the 5G connection manager 606 may transmit one or more requests (such as iterative requests) to the CPE connection manager 604. In some implementations, a request transmitted to the CPE connection manager 504 may include a request to setup a network slice. In response to the request received by the CPE connection manager 604, the CPE connection manager 604 may transmit at 646 a confirmation of a successful setup of the network slice.

In some examples, at 648, the 5G network and the application provider may setup a network slice (for example using an iterative method to request a setup associated with a network slice and confirm the setup associated with the network slice). At 650, the 5G connection manager 606 may receive a confirmation to access an available network slice (such as the available network slice requested by the UE t 602). For example, the 5G connection manager 606 may receive the confirmation from a network device (such as the application provider 616).

At 652, once the network slice setup is successful, the 5G connection manager 606 may establish a connection associated with the available network slice. For example, the 5G connection manager 606 alone or in conjunction with the 5G modem may establish a packet data network associated with a requested network slice (such as available network slice or new network slice). At 654, the 5G connection manager 606 may transmit an indication of a successful setup of a network slice to the CPE connection manager 604.

At 656, the CPE connection manager 604 may transmit, to the UE 602, a confirmation to access the available network slice. At 658, the UE 602 may access a new data session with the application provider 616. For example, upon a successful establishment of a connection (such as a packet data network) at the 5G-CPE 618, the connection may then be forwarded to the UE 602 for further usage. In some implementations, the 5G-CPE 618 may route traffic related to the established network slice over the established packet data network by programming one or more rules in a dataflow associated with the traffic. In some implementations, the 5G-CPE 618 may program the dataflow at an acceleration or data-path engine of the 5G-CPE 618 (not shown). In some examples, at 660, the 5G-CPE 618 (at the URSP daemon 610) may be configured to auto-learn and setup one or more QOS rules (or QOS parameters) associated with the established or accessed network slice. For example, the URSP daemon 610 may determine at least one QOS parameter associated with the available network slice based on initiating the new communication session.

At 662, the UE 602 may transmit, to the application provider 616, an indication to terminate the new communication session (for example, the communication session established using available network slices). In some implementations, the 5G-CPE 618 may receive an indication of a termination of the new communication session associated with the available network slice. At 664, the application provider 616 may indicate, the UE 602, that the communication session has successfully closed. In some examples, the 5G-CPE 618 may transmit, to the UE 602, a confirmation to terminate the new communication session associated with the available network slice.

At 666, the 5G-CPE 618 (at the CPE connection manager 604) may receive an indication of a released network slice from the UE 603. In some implementations, the 5G-CPE 618 may receive the indication based on transmitting the confirmation to terminate the new communication session. For example, the UE 602 may release a network slice in response to termination of the communication session, and may transmit the indication of the released network slice to the 5G-CPE 618. In some examples, the released network slice may include the available network slice (such as the available network slice determined by the 5G-CPE 618). At 668, the CPE connection manager 604 may transmit the indication of the released network slice to the 5G connection manager 606. In some examples, the CPE connection manager 604 may forward the indication received from the UE 602. Alternatively, the CPE connection manager 604 may transmit a second indication based on the indication received from the UE 602.

At 670, the 5G-CPE 618 in conjunction with the 5G network 614 may terminate the packet data network (or connection) associated with the available network slice. At 672, the 5G network 614 in conjunction with the application provider 616 may confirm the termination of the packet data network using an iterative process.

At 674, the 5G network 614 may transmit to the 5G connection manager 606, an indication of a successful termination of the packet data network. At 676, the 5G connection manager 606 may transmit a message to the QOS manager 608. The message may include an indication to release network slice resources (such as frequency resources and time resources). At 678, upon receiving the message from the 5G connection manager 606, the QOS manager 608 may update the QOS parameter associated with the released network slice.

At 680, the 5G connection manager 606 may transmit a message to the CPE connection manager 604 indicating a release of one or more resources associated with the released network slice. In some examples, the message to the CPE connection manager 604 may be the same as or based on the message described at 676. At 682, the CPE connection manager 604 may transmit, to the UE 602, a message indicating a release of one or more resources associated with the released network slice. As described herein, the message to the UE 602 may be the same as or based on the message described at 680.

Figure 7:
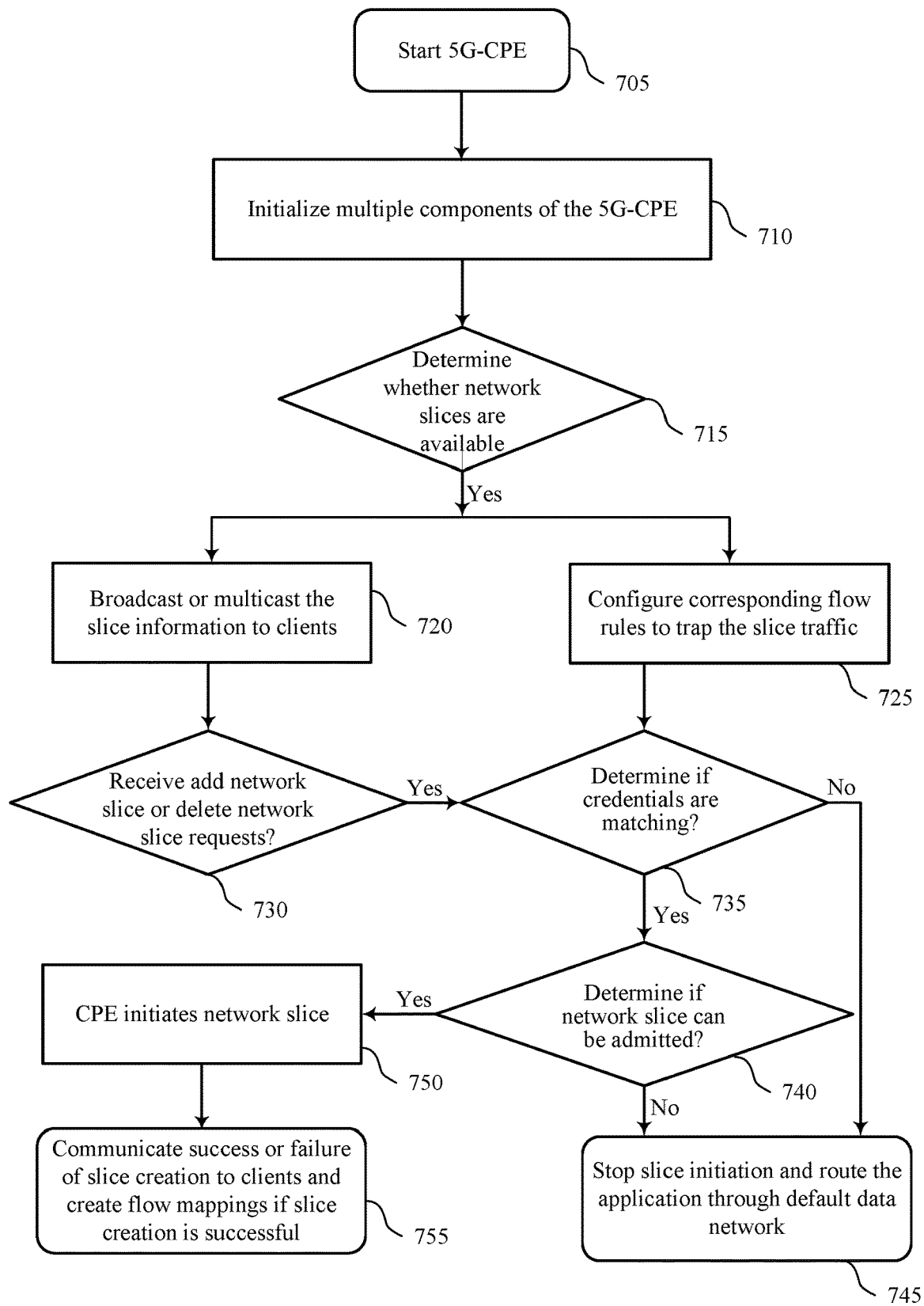
FIG. 7 illustrates an example process for LAN clients to participate in a network slice according to some implementations.

FIG. 7 illustrates an example process 700 for LAN clients to participate in a network slice according to some implementations. The process 700 may be associated with a 5G-CPE (such as AP 102), which may be an example of a wireless communication device. The 5G-CPE may be configured to perform one or more of the processes 1200, 1300, and 1400 described above with reference to FIGS. 12, 13, and 14, respectively. In some implementations, the 5G-CPE can be an example implementation of a wireless communication device 400 described herein with reference to FIG. 4, or a wireless communication device described herein with reference to FIG. 8 or a wireless communication device described herein with reference to FIG. 9. For example, the 5G-CPE can be a chip, SoC, chipset, package or device that includes at least one processor, a Wi-Fi (IEEE 802.11) modem, and a cellular modem.

Alternative examples of the process 700 may be implemented, in which some steps may be performed in a different order than described, some steps may be added, or some steps may not be performed at all. In some implementations, steps may include additional features not described below.

In some implementations, in block 705, the 5G-CPE (such as a CPE having a capability to access a 5G network) is initialized (or started). In block 710, the 5G-CPE may initialize multiple components. In block 715, the 5G-CPE may determine whether network slices are available. In block 720, in response to determining that network slices are available, the 5G-CPE may broadcast or multicast the network slice information to one or more UEs (such as STAs or LAN clients). In block 725, in response to determining that network slices are available, the 5G-CPE may configure corresponding flow rules to trap (or collect) traffic associated with a network slice. As described with reference to FIG. 7, the process described in block 725 may be associated with UEs unaware of network slices. Additionally or alternatively, the process described in block 720 may be associated with UEs aware of network slices.

In some implementations, in block 730, the 5G-CPE may receive a request to add a network slice or delete a network slice. In block 735, in response to collecting traffic associated with the network slice, the 5G-CPE may determine whether one or more credentials match an existing credential. Additionally or alternatively, the 5G-CPE may determine whether one or more credentials match an existing credential in response to receiving the request to add the network slice or delete the network slice. If the 5G-CPE determines that the one or more credentials do not match the existing credential, in block 745, the 5G-CPE may terminate slice initiation and route the application through a default data network.

In some implementations, in response to determining that the one or more credentials match the existing credential, in block 740, the 5G-CPE may determine whether the network slice may be admitted in a data flow. In block 750, in response to determining that the network slice may be admitted, the 5G-CPE may initiate the network slice. Alternatively, in block 745, in response to determining that the network slice may not be admitted, the 5G-CPE may stop (or terminate) slice initiation and route the application through a default data network. In block 755, the 5G-CPE may communicate success or failure of slice creation to clients and create flow mappings if slice creation is successful.

In some implementations, initializing multiple components in block 710 includes initializing multiple components of the 5G-CPE. For example, the 5G-CPE initializes a CPE connection manager, a 5G connection manager, a QOS manager, and a URSP daemon, each of which may be examples of modules described with reference to FIGS. 4-6.

Figure 8:
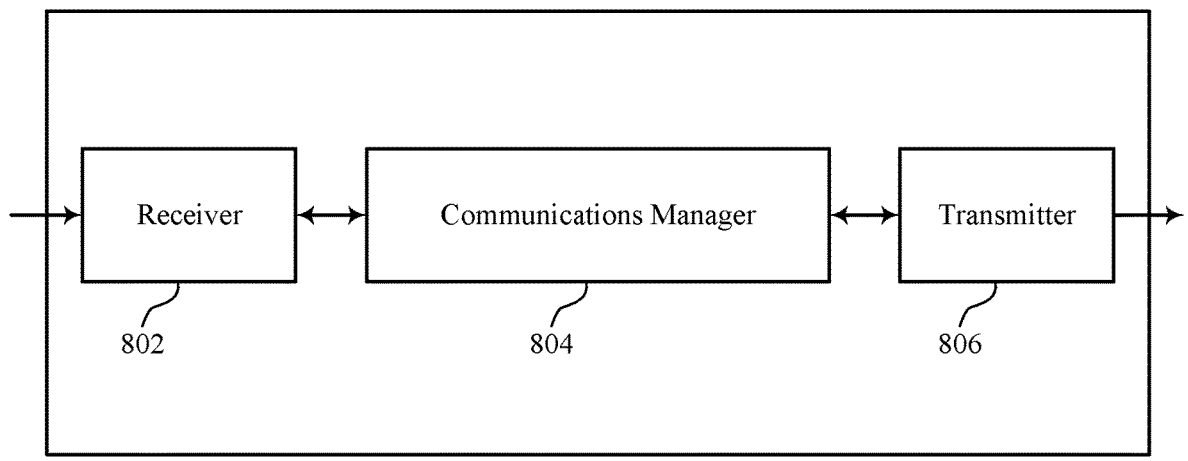
FIG. 8 shows a block diagram of an example wireless communication device that supports techniques for LAN clients participation in a network slice according to some implementations.

FIG. 8 shows a block diagram of an example wireless communication device that supports techniques for LAN clients participation in a network slice according to some implementations. In some implementations, the wireless communication device is configured to perform one or more of the processes 1200, 1300, and 1400 described above with reference to FIGS. 12, 13, and 14, respectively. In some implementations, the wireless communication device can be an example implementation of a wireless communication device 400 described herein with reference to FIG. 4 or a wireless communication device described herein with reference to FIG. 9. For example, the wireless communication device can be a chip, SoC, chipset, package or device that includes at least one processor, a Wi-Fi (IEEE 802.11) modem, and a cellular modem.

In some implementations, the wireless communication device can be a CPE or a device for use in a CPE (as such, the wireless communication device may hereinafter be referred to as CPE). In some implementations, the CPE can be, or can include, an AP (such as AP 102) for serving one or more WLANs such as using a Wi-Fi network or a 5G network.

The wireless communication device may include a receiver 802, a communications manager 804, and a transmitter 806. Portions of one or more of the modules 802, 804, and 806 may be implemented at least in part in hardware or firmware. In some implementations, at least some of the modules 802, 804, and 806 are implemented at least in part as software stored in a memory. For example, portions of one or more of the modules 802, 804, and 806 can be implemented as non-transitory instructions (or "code") executable by a processor to perform the functions or operations of the respective module.

The receiver 802 is configured to receive information such as packets, user data, or control information associated with various information channels (for example, control channels, data channels, and information related to participation of LAN clients in a network slice). Information may be passed on to other components of the device. The receiver 802 may be an example of aspects of the transceiver 1120 described with reference to FIG. 11. The receiver 802 may utilize a single antenna or a set of antennas.

The communications manager 804 may transmit, to one or more LAN clients of the device, a multicast message indicating an available network slice. The communications manager 804 may then receive, from a first LAN client of the one or more LAN clients based on the multicast message, a request to access the available network slice and establish, at the wireless communication device based on receiving the request, a connection associated with the available network slice. The communications manager 804 may transmit, to the first LAN client based on establishing the connection, a confirmation to access the available network slice.

The communications manager 804 may also transmit, to one or more LAN clients of the device, a multicast message indicating an available network slice. The communications manager 804 may receive, from a first LAN client of the one or more LAN clients based on the multicast message, an identifier associated with the available network slice, establish, at the device based on a successful validation of the identifier, a connection associated with the available network slice, and transmit, to the first LAN client based on establishing the connection, a confirmation to access the available network slice. The communications manager 804 may be an example of aspects of the communications manager 1110 described herein.

The transmitter 806 may transmit signals generated by other components of the device. In some examples, the transmitter 806 may be collocated with a receiver 802 in a transceiver module. For example, the transmitter 806 may be an example of aspects of the transceiver 1120 described with reference to FIG. 11. The transmitter 806 may utilize a single antenna or a set of antennas.

Figure 9:
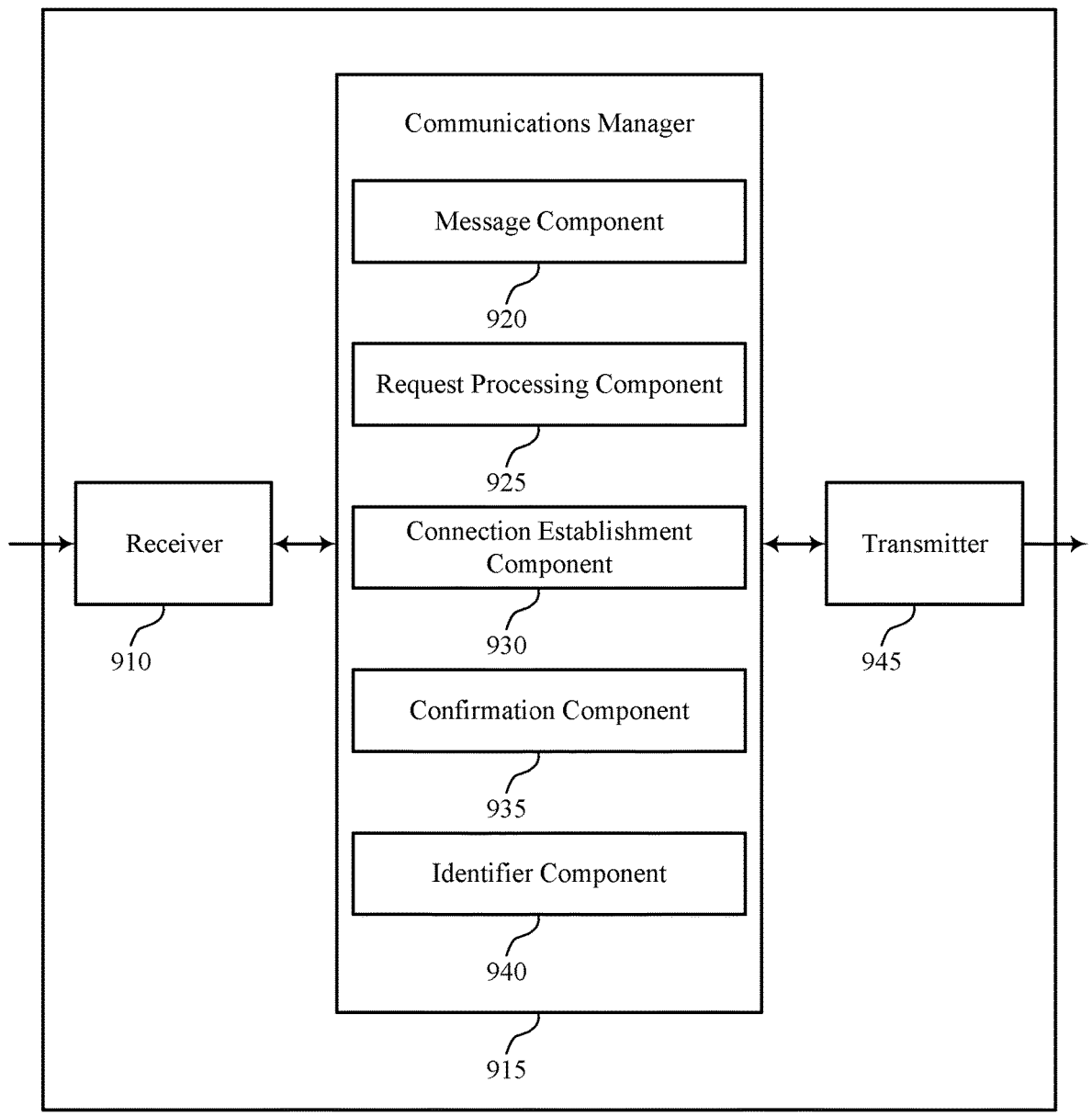
FIG. 9 shows a block diagram of an example wireless communication device that supports techniques for LAN clients participation in a network slice according to some implementations.

FIG. 9 shows a block diagram of an example wireless communication device that supports techniques for LAN clients participation in a network slice according to some implementations. In some implementations, the wireless communication device is configured to perform one or more of the processes 1200, 1300, and 1400 described above with reference to FIGS. 12, 13, and 14, respectively. In some implementations, the wireless communication device can be an example implementation of a wireless communication device 400 described herein with reference to FIG. 4 or a wireless communication device described herein with reference to FIG. 8. For example, the wireless communication device can be a chip, SoC, chipset, package or device (such as a CPE) that includes at least one processor, a Wi-Fi (IEEE 802.11) modem, and a cellular modem).

In some implementations, the wireless communication device can be a CPE or a device for use in a CPE (as such, the wireless communication device may hereinafter be referred to as CPE). In some implementations, the CPE can be, or can include, an AP (such as AP 102) for serving one or more WLANs such as using a Wi-Fi network or a 5G network.

The wireless communication device includes a receiver 910, a communications manager 915, a message component 920, a request processing component 925, a connection establishment component 930, a confirmation component 935, an identifier component 940, and a transmitter 945. Portions of one or more of the modules 910, 915, 920, 925, 930, 935, 940, and 945 may be implemented at least in part in hardware or firmware. In some implementations, at least some of the modules 910, 915, 920, 925, 930, 935, 940, and 945 are implemented at least in part as software stored in a memory. For example, portions of one or more of the modules 910, 915, 920, 925, 930, 935, 940, and 945 can be implemented as non-transitory instructions (or "code") executable by a processor to perform the functions or operations of the respective module.

The receiver 910 may receive information such as packets, user data, or control information associated with various information channels (for example, control channels, data channels, and information related to participation of LAN clients in a network slice). Information may be passed on to other components of the device. The receiver 910 may be an example of aspects of the transceiver 1120 described with reference to FIG. 11. The receiver 910 may utilize a single antenna or a set of antennas.

The communications manager 915 may be an example of aspects of the communications manager 804 as described herein. The communications manager 915 804 is configured to include a message component 920, a request processing component 925, a connection establishment component 930, a confirmation component 935, and an identifier component 940. The communications manager 915 may be an example of aspects of the communications manager 1110 described herein.

The message component 920 is configured to transmit, to one or more LAN clients of the device, a multicast message indicating an available network slice. The request processing component 925 is configured to receive, from a first LAN client of the one or more LAN clients based on the multicast message, a request to access the available network slice.

The connection establishment component 930 is configured to establish, at the device based on receiving the request, a connection associated with the available network slice. The confirmation component 935 is configured to transmit, to the first LAN client based on establishing the connection, a confirmation to access the available network slice.

The message component 920 is configured to transmit, to one or more LAN clients of the device, a multicast message indicating an available network slice. The identifier component 940 is configured to receive, from a first LAN client of the one or more LAN clients based on the multicast message, an identifier associated with the available network slice.

The connection establishment component 930 is configured to establish, at the device based on a successful validation of the identifier, a connection associated with the available network slice. The confirmation component 935 is configured to transmit, to the first LAN client based on establishing the connection, a confirmation to access the available network slice.

The transmitter 945 is configured to transmit signals generated by other components of the device. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
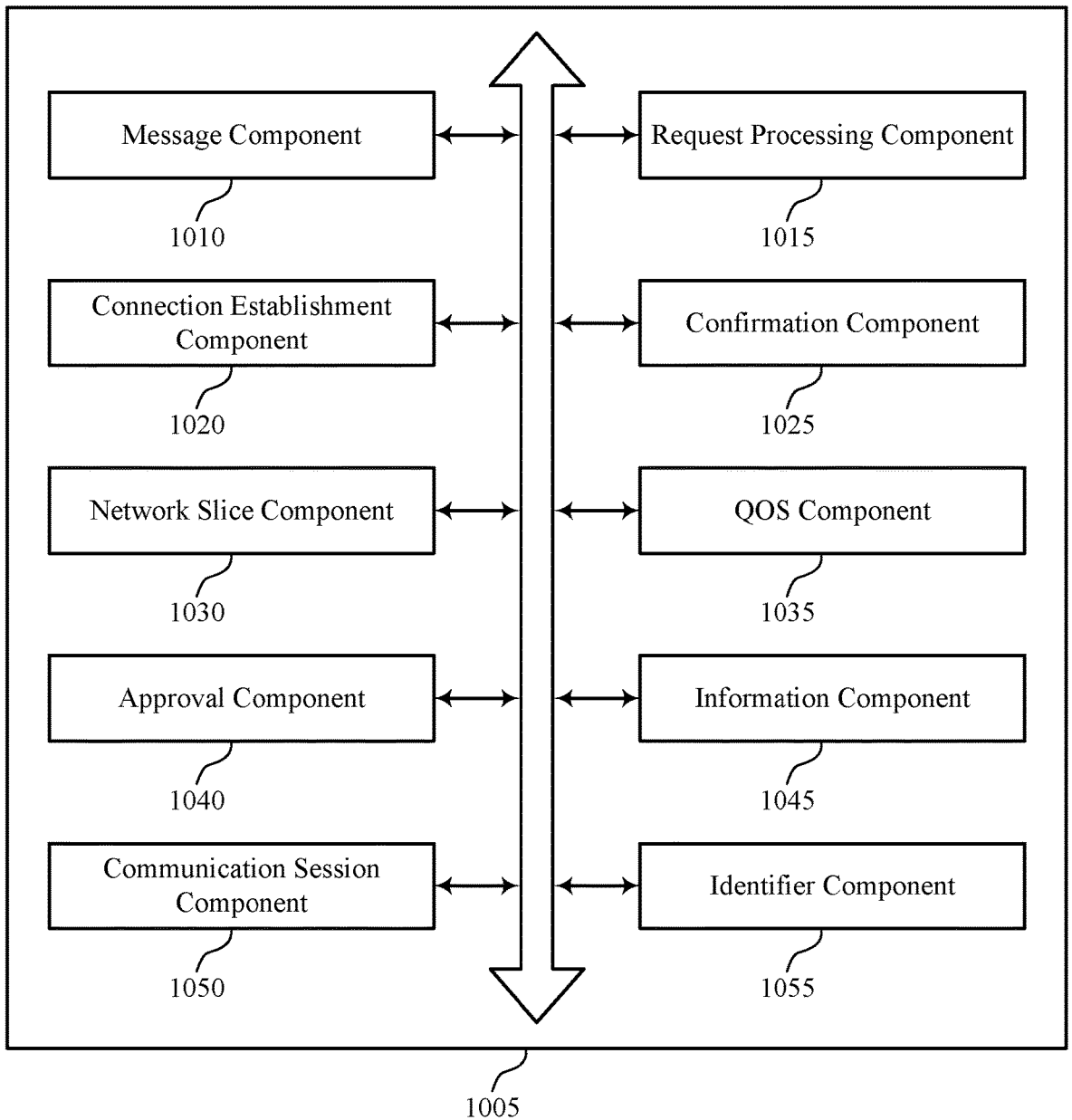
FIG. 10 shows a block diagram of an example communications manager that supports techniques for LAN clients participation in a network slice according to some implementations.

FIG. 10 shows a block diagram of an example wireless communication device that supports techniques for LAN clients participation in a network slice according to some implementations. In some implementations, the wireless communication device is configured to perform one or more of the processes 1200, 1300, and 1400 described above with reference to FIGS. 12, 13, and 14, respectively. In some implementations, the wireless communication device can be an example implementation of a wireless communication device 400 described herein with reference to FIG. 4 or a wireless communication device described herein with reference to FIG. 8 or a wireless communication device described herein with reference to FIG. 9. For example, the wireless communication device can be a chip, SoC, chipset, package or device (such as a CPE) that includes at least one processor, a Wi-Fi (IEEE 802.11) modem, and a cellular modem.

In some implementations, the wireless communication device can be a CPE or a device for use in a CPE (as such, the wireless communication device may hereinafter be referred to as CPE). In some implementations, the CPE can be, or can include, an AP (such as AP 102) for serving one or more WLANs such as using a Wi-Fi network or a 5G network.

The wireless communication device includes a message component 1010, a request processing component 1015, a connection establishment component 1020, a confirmation component 1025, a network slice component 1030, a QOS component 1035, an approval component 1040, an information component 1045, a communication session component 1050, and an identifier component 1055. Portions of one or more of the modules 1010, 1015, 1020, 1025, 1030, 1035, 1040, 1045, 1050, and 1055 may be implemented at least in part in hardware or firmware. In some implementations, at least some of the modules 1010, 1015, 1020, 1025, 1030, 1035, 1040, 1045, 1050, and 1055 are implemented at least in part as software stored in a memory. For example, portions of one or more of the modules 1010, 1015, 1020, 1025, 1030, 1035, 1040, 1045, 1050, and 1055 can be implemented as non-transitory instructions (or "code") executable by a processor to perform the functions or operations of the respective module.

The message component 1010 is configured to transmit, to one or more LAN clients of the device, a multicast message indicating an available network slice. In some examples, the message component 1010 is configured to transmit, to one or more LAN clients of the device, a multicast message indicating an available network slice. In some implementations, the multicast message includes one or more of a broadcast message, or a universal plug-and-play message.

The request processing component 1015 is configured to receive, from a first LAN client of the one or more LAN clients based on the multicast message, a request to access the available network slice. The connection establishment component 1020 is configured to establish, at the device (such as a CPE) based on receiving the request, a connection associated with the available network slice. The confirmation component 1025 may transmit, to the first LAN client based on establishing the connection, a confirmation to access the available network slice.

The network slice component 1030 is configured to determine one or more data packets associated with the available network slice. The QOS component 1035 is configured to determine whether the one or more data packets satisfy a QOS threshold, where establishing the connection associated with the available network slice is based on determining that the one or more data packets satisfy the QOS threshold.

In some examples, the request processing component 1015 is configured to transmit, to a network device based on receiving the request, a second request to access the available network slice. In some examples, the confirmation component 1025 is configured to receive, from the network device, a confirmation to access the available network slice, where establishing the connection associated with the available network slice is based on receiving the confirmation from the network device, and where the confirmation transmitted to the first LAN client is based on the confirmation received from the network device.

In some examples, the network slice component 1030 is configured to receive, from the network device, information associated with a set of network slices based on transmitting the request. In some examples, the network slice component 1030 is configured to delete the second network slice based on receiving the second request.

In some examples, the request processing component 1015 is configured to receive, from the first LAN client, a second request to create a new network slice, where the second request is based on the multicast message. The approval component 1040 is configured to determine an approval status associated with the new network slice. In some examples, the request processing component 1015 is configured to transmit, to a network device based on determining the approval status, a third request to access the new network slice. In some examples, the confirmation component 1025 is configured to receive, from the network device based on transmitting the third request, a confirmation to access the new network slice.

In some examples, the message component 1010 is configured to transmit the multicast message is based on determining the available network slice. In some examples, the message component 1010 is configured to transmit, to the first LAN client based on receiving the indication of the released slice, a message indicating a release of one or more resources associated with the released slice.

In some examples, the request processing component 1015 is configured to receive, from the first LAN client, a second request to delete a second network slice, where the second request is based on the multicast message. In some examples, the request processing component 1015 is configured to receive, from the first LAN client, a second request to initialize an application using a first wireless area network. In some examples, the request processing component 1015 is configured to receive, from the first LAN client, a request to initialize an application at the first LAN client using a first wireless area network, where receiving the identifier is based on receiving the request.

In some examples, the request processing component 1015 is configured to receive, from the first LAN client, a request associated with the available network slice. In some examples, receiving the identifier associated with the available network slice is based on receiving the request. In some examples, the request processing component 1015 is configured to determine, in response to receiving the request, that the request is associated with the available network slice, where establishing the connection associated with the available network slice is based on determining that the request is associated with the available network slice.

In some examples, the request processing component 1015 is configured to transmit, to a network device based on receiving the identifier, a request to access the available network slice. In some examples, the request processing component 1015 is configured to receive, from the first LAN client, a request to initialize an application using a first wireless area network.

In some examples, the request processing component 1015 is configured to transmit, to a network device, the request to initialize the application of the first LAN client using the first wireless area network. In some examples, the connection establishment component 1020 is configured to establish, at the device based on a successful validation of the identifier, a connection associated with the available network slice.

In some examples, the connection establishment component 1020 is configured to establish, at the device based on receiving the confirmation to access the new network slice, a second connection associated with the new network slice. In some examples, the confirmation component 1025 is configured to transmit, to the first LAN client based on establishing the connection, a confirmation to access the available network slice.

In some examples, the confirmation component 1025 is configured to transmit, to the first LAN client based on establishing the second connection, the confirmation to access the new network slice. In some examples, the confirmation component 1025 is configured to transmit, to the first LAN client, a confirmation to terminate the new communication session associated with the available network slice.

In some examples, the confirmation component 1025 is configured to receive, from the network device, a confirmation to access the available network slice, where establishing the connection associated with the available network slice is based on receiving the confirmation from the network device, and where the confirmation transmitted to the first LAN client is based on the confirmation received from the network device. In some examples, the confirmation component 1025 is configured to transmit, to the first LAN client, a confirmation to terminate the new communication session associated with the available network slice.

The identifier component 1055 is configured to receive, from a first LAN client of the one or more LAN clients based on the multicast message, an identifier associated with the available network slice. In some examples, the identifier component 1055 may determine, in response to receiving the request, whether the identifier associated with the available network slice matches a second identifier, where establishing the connection associated with the available network slice is based on determining that the identifier associated with the available network slice matches the second identifier.

In some examples, receiving, from the first LAN client, an indication of a released slice based on transmitting the confirmation to terminate the new communication session, where the released slice includes the available network slice. In some examples, receiving, from the first LAN client, an indication of a released slice based on transmitting the confirmation to terminate the new communication session, where the released slice includes the available network slice.

In some examples, the QOS component 1035 is configured to determine a QOS parameter associated with the available network slice based on initiating the new communication session. In some examples, the QOS component 1035 is configured to update the QOS parameter associated with the available network slice based on receiving the indication of the released slice.

In some examples, the QOS component 1035 is configured to determine whether the one or more data packets satisfy a QOS threshold, where establishing the connection associated with the available network slice is based on determining that the one or more data packets satisfy the QOS threshold. In some examples, the QOS component 1035 is configured to determine a QOS parameter associated with the available network slice based on initiating the new communication session. In some examples, the QOS component 1035 is configured to update the QOS parameter associated with the available network slice based on receiving the indication of the released slice.

The information component 1045 is configured to receive, from the network device, information associated with a set of network slices based on transmitting the second request. In some implementations, the information includes one or more of network slice selection assistance information, configured slice selection assistance information, or allowed slice selection assistance information. The communication session component 1050 is configured to initiate, in response to transmitting the confirmation to access the available network slice, a new communication session with an application provider. In some examples, the communication session component 1050 is configured to receive, from the first LAN client, an indication of a termination of the new communication session associated with the available network slice.

In some examples, the communication session component 1050 is configured to initiate, in response to transmitting the confirmation to access the available network slice, a new communication session with an application provider. In some examples, the communication session component 1050 is configured to receive, from the first LAN client, an indication of a termination of the new communication session associated with the available network slice.

Figure 11:
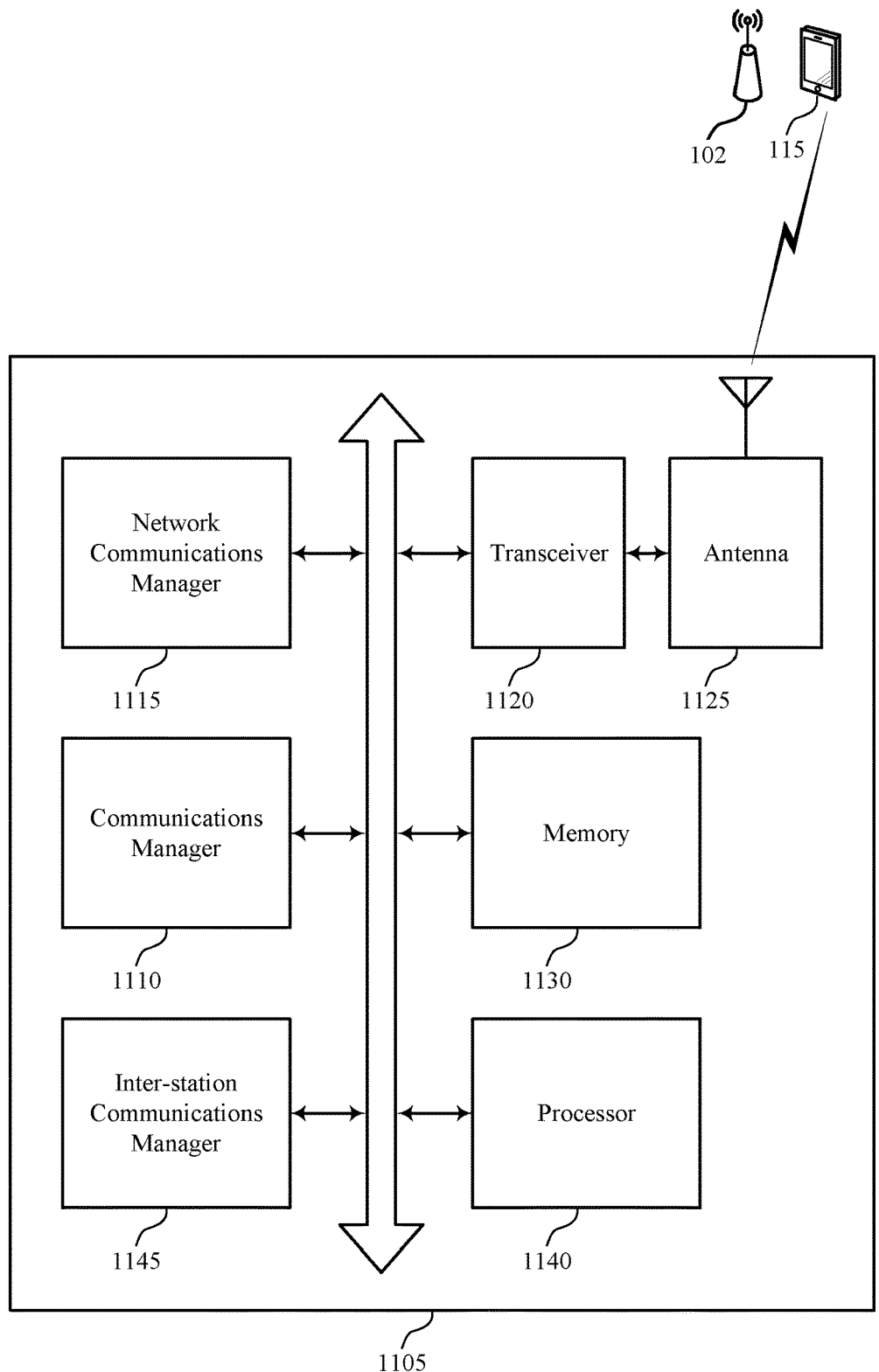
FIG. 11 shows a block diagram of an example wireless communication system that supports techniques for LAN clients participation in a network slice according to some implementations.

FIG. 11 shows a block diagram of an example wireless communication system that supports techniques for LAN clients participation in a network slice according to some implementations. A wireless communication device 1105 may be configured to perform one or more of the processes 1200, 1300, and 1400 described above with reference to FIGS. 12, 13, and 14, respectively. In some implementations, the wireless communication device 1105 can be an example implementation of wireless communication device 400 described herein with reference to FIG. 4 or a wireless communication device described herein with reference to FIG. 8 or a wireless communication device described herein with reference to FIG. 9. For example, the wireless communication device 1105 can be a chip, SoC, chipset, package or device that includes at least one processor, a Wi-Fi (IEEE 802.11) modem, and a cellular modem.

In some implementations, the wireless communication device 1105 can be a CPE or a device for use in a CPE (as such, the wireless communication device 1105 may hereinafter be referred to as CPE). In some implementations, the CPE can be, or can include, an AP (such as AP 102) for serving one or more WLANs such as using a Wi-Fi network or a 5G network.

The wireless communication device 1105 includes a communications manager 1110, network communications manager 1115, a transceiver 1120, one or more antennas 1125, memory 1130, a processor 1140, and an inter-station communications manager 1145. Portions of one or more of the modules 1110, 1115, 1120, 1125, 1130, 1014, 1140, and 1145 may be implemented at least in part in hardware or firmware. For example, the communications manager 1110 at least in part by a modem. In some implementations, at least some of the modules 1110, 1115, 1120, 1125, 1130, 1014, 1140, and 1145 are implemented at least in part as software stored in a memory. For example, portions of one or more of the modules 1110, 1115, 1120, 1125, 1130, 1014, 1140, and 1145 can be implemented as non-transitory instructions (or "code") executable by a processor to perform the functions or operations of the respective module.

The communications manager 1110 is configured to transmit, to one or more LAN clients (such as UEs or STAs) of the device, a multicast message indicating an available network slice and receive, from a first LAN client of the one or more LAN clients based on the multicast message, a request to access the available network slice. The communications manager 1110 is configured to establish, at the device based on receiving the request, a connection associated with the available network slice, and transmit, to the first LAN client based on establishing the connection, a confirmation to access the available network slice. The communications manager 1110 is further configured to transmit, to one or more LAN clients of the device, a multicast message indicating an available network slice.

The communications manager 1110 is configured to receive, from a first LAN client of the one or more LAN clients based on the multicast message, an identifier associated with the available network slice, and establish, at the device based on a successful validation of the identifier, a connection associated with the available network slice The communications manager 1110 is configured to transmit, to the first LAN client based on establishing the connection, a confirmation to access the available network slice.

The network communications manager 1115 is configured to manage communications with the core network (for example, via one or more wired backhaul links). For example, the network communications manager 1115 is configured to manage the transfer of data communications for client devices, such as one or more UEs 115.

The transceiver 1120 is configured to communicate bi-directionally, via one or more antennas, wired, or wireless links as described above. For example, the transceiver 1120 is configured to represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some implementations, the wireless device may include a single antenna 1125. However, in some implementations, the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some implementations, the memory 1130 may contain, among other things, a basic input/output system (BIOS) which may control basic hardware or software operation such as the interaction with peripheral components or devices.

The processor 1140 may include an intelligent hardware device, (for example, general-purpose processor, a digital signal processor (DSP), a CPU, a microcontroller, an application specific integrated circuit (ASIC), a field-programmable gate array (FPGA), a programmable logic device, a discrete gate or transistor logic component, a discrete hardware component, or any combination thereof). In some implementations, the processor 1140 may be configured to operate a memory array using a memory controller. In other implementations, a memory controller may be integrated into processor 1140. The processor 1140 may be configured to execute computer-readable instructions stored in a memory to perform various functions (for example, functions or tasks supporting participation of LAN clients in a network slice).

The inter-station communications manager 1145 is configured to manage communications with other wireless communication devices (for example, the APs 102 or the STAs 104), and may include a controller or scheduler for controlling communications. For example, the inter-station communications manager 1145 may coordinate scheduling for transmissions for various interference mitigation techniques such as beamforming or joint transmission.

Figure 12:
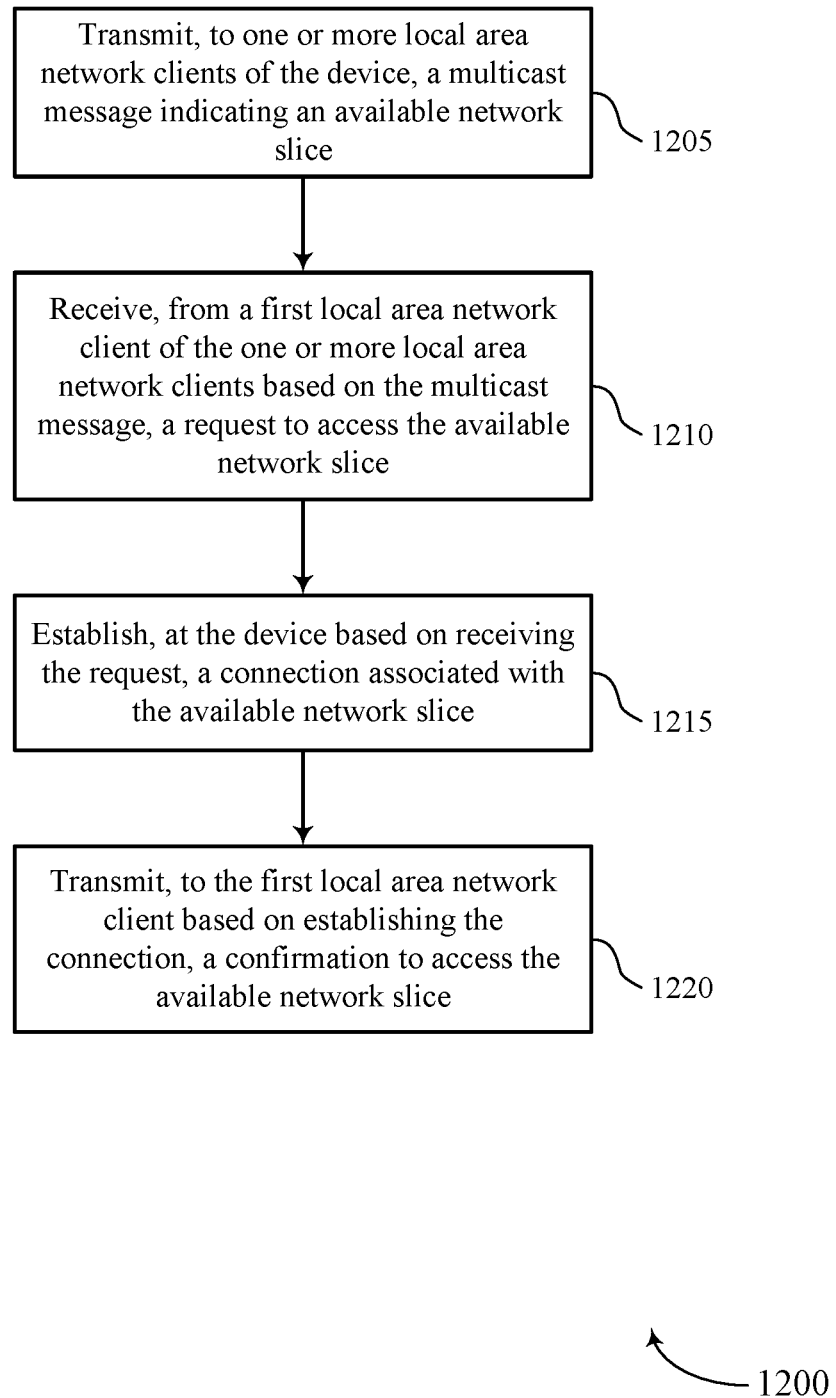
FIG. 12 shows a flowchart illustrating an example process for LAN clients to participate in a network slice according to some implementations.

FIG. 12 shows a flowchart illustrating an example process 1200 for LAN clients to participate in a network slice according to some implementations. The process 1200 may be implemented by a wireless communication device (such as a CPE, or an AP) such as the wireless communication device described above with reference to FIGS. 8-10. In some implementations, the process 1200 begins in block 1205 with transmitting a multicast message. In block 1210, the process 1200 proceeds with receiving a request to access the available network slice. In block 1215, the process 1200 proceeds with establishing a connection associated with the available network slice. In block 1220, the process 1200 further proceeds with transmitting a confirmation to access the available network slice.

In some implementations, transmitting the multicast message in block 1205 includes transmitting, to one or more LAN clients (such as UEs) of the device, the multicast message indicating an available network slice. The operations of 1205 may be performed according to the methods described herein. In some examples, aspects of the operations of 1205 may be performed by a message component as described with reference to FIGS. 8-11.

In some implementations, receiving the request to access the available network slice in block 1210 includes receiving the request from a first LAN client of the one or more LAN clients. In some examples, the request may be based on the transmitted multicast message. The operations of 1210 may be performed according to the methods described herein. In some examples, aspects of the operations of 1210 may be performed by a request processing component as described with reference to FIGS. 8-11.

In some implementations, establishing the connection associated with the available network slice in block 1215 includes establishing, at the device, the connection associated with the available network slice. In some examples, the device may include the wireless communication device. In some examples, the wireless communication device may establish the connection based on receiving the request. The operations of 1215 may be performed according to the methods described herein. In some examples, aspects of the operations of 1215 may be performed by a connection establishment component as described with reference to FIGS. 8-11.

In some implementations, transmitting the confirmation to access the available network slice in block 1220 includes transmitting the confirmation to the first LAN client. In some implementations, transmitting the confirmation to access the available network slice in block 1220 includes transmitting the confirmation based on establishing the connection. The operations of 1220 may be performed according to the methods described herein. In some examples, aspects of the operations of 1220 may be performed by a confirmation component as described with reference to FIGS. 8-11.

Figure 13:
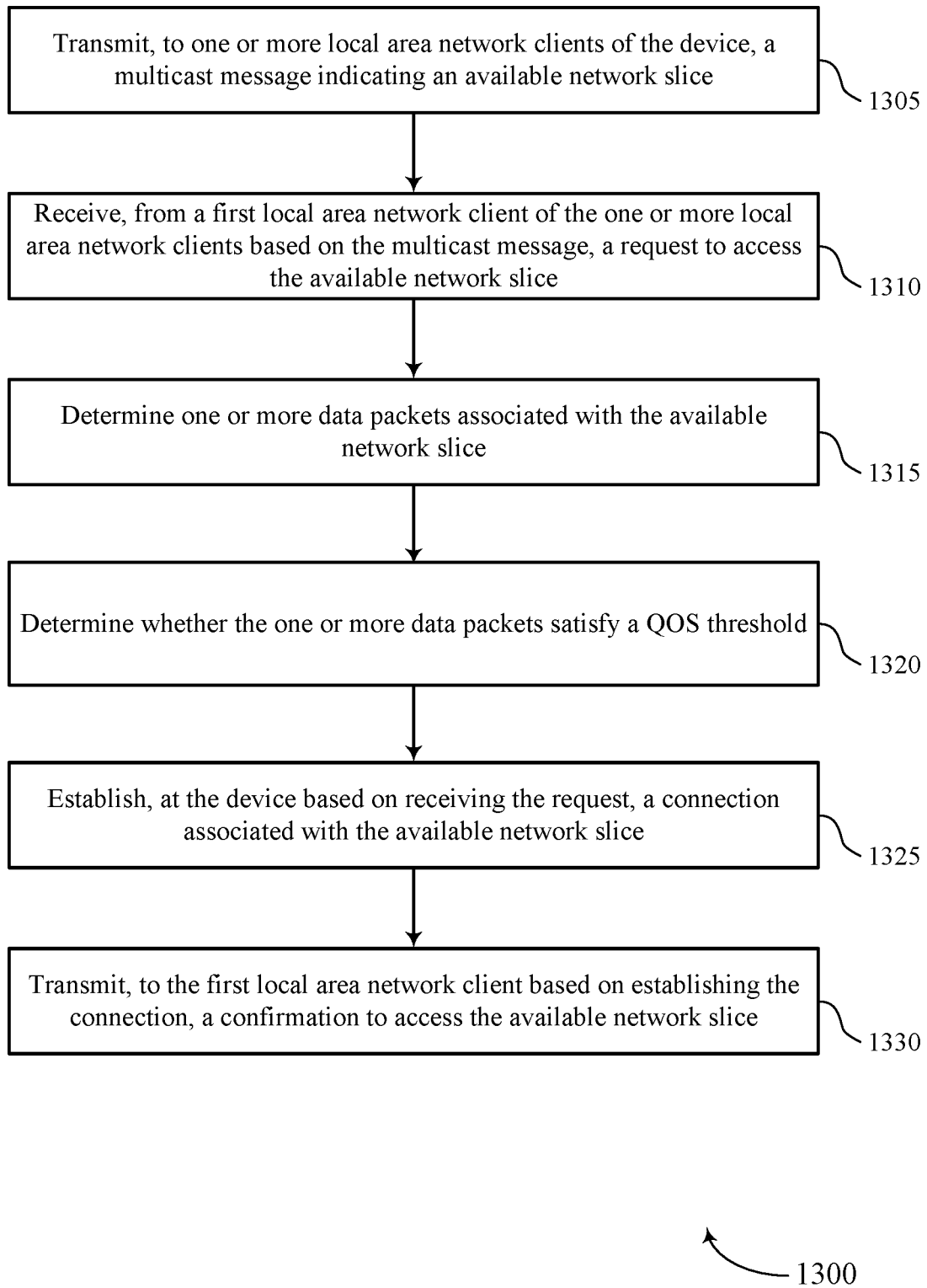
FIG. 13 shows a flowchart illustrating an example process for LAN clients to participate in a network slice according to some implementations.

FIG. 13 shows a flowchart illustrating an example process 1300 for LAN clients to participate in a network slice according to some implementations. The process 1300 may be implemented by a wireless communication device (such as a CPE, or an AP) such as the wireless communication device described above with reference to FIGS. 8-10. In some implementations, the process 1300 begins in block 1305 with transmitting a multicast message. In block 1310, the process 1300 proceeds with receiving a request to access the available network slice. In block 1315, the process 1300 proceeds with determining one or more data packets. In block 1320, the process 1300 further proceeds with determining whether the one or more data packets satisfy a QOS threshold. In block 1325, the process 1300 further proceeds with establishing a connection. In block 1330, the process 1300 further proceeds with transmitting a confirmation to access the available network slice.

In some implementations, transmitting the multicast message in block 1305 includes transmitting, to one or more LAN clients (such as UEs) of the device, the multicast message indicating an available network slice. The operations of 1305 may be performed according to the methods described herein. In some examples, aspects of the operations of 1305 may be performed by a message component as described with reference to FIGS. 8-11.

In some implementations, receiving the request to access the available network slice in block 1310 includes receiving, from a first LAN client of the one or more LAN clients based on the multicast message, a request to access the available network slice. The operations of 1310 may be performed according to the methods described herein. In some examples, aspects of the operations of 1310 may be performed by a request processing component as described with reference to FIGS. 8-11.

In some implementations, determining one or more data packets slice in block 1315 includes determining one or more data packets associated with the available network slice. The operations of 1315 may be performed according to the methods described herein. In some examples, aspects of the operations of 1315 may be performed by a network slice component as described with reference to FIGS. 8-11.

In some implementations, determining whether the one or more data packets satisfy the QOS threshold in block 1320 includes determining whether the one or more data packets satisfy a QOS threshold. In some implementations, establishing the connection associated with the available network slice is based on determining that the one or more data packets satisfy the QOS threshold. The operations of 1320 may be performed according to the methods described herein. In some examples, aspects of the operations of 1320 may be performed by a QOS component as described with reference to FIGS. 8-11.

In some implementations, establishing a connection in block 1325 includes establishing at the device based on receiving the request, a connection associated with the available network slice. The operations of 1325 may be performed according to the methods described herein. In some examples, aspects of the operations of 1325 may be performed by a connection establishment component as described with reference to FIGS. 8-11.

In some implementations, transmitting the confirmation to access the available network slice in block 1330 includes transmitting, to the first LAN client based on establishing the connection, the confirmation to access the available network slice. The operations of 1330 may be performed according to the methods described herein. In some examples, aspects of the operations of 1330 may be performed by a confirmation component as described with reference to FIGS. 8-11.

Figure 14:
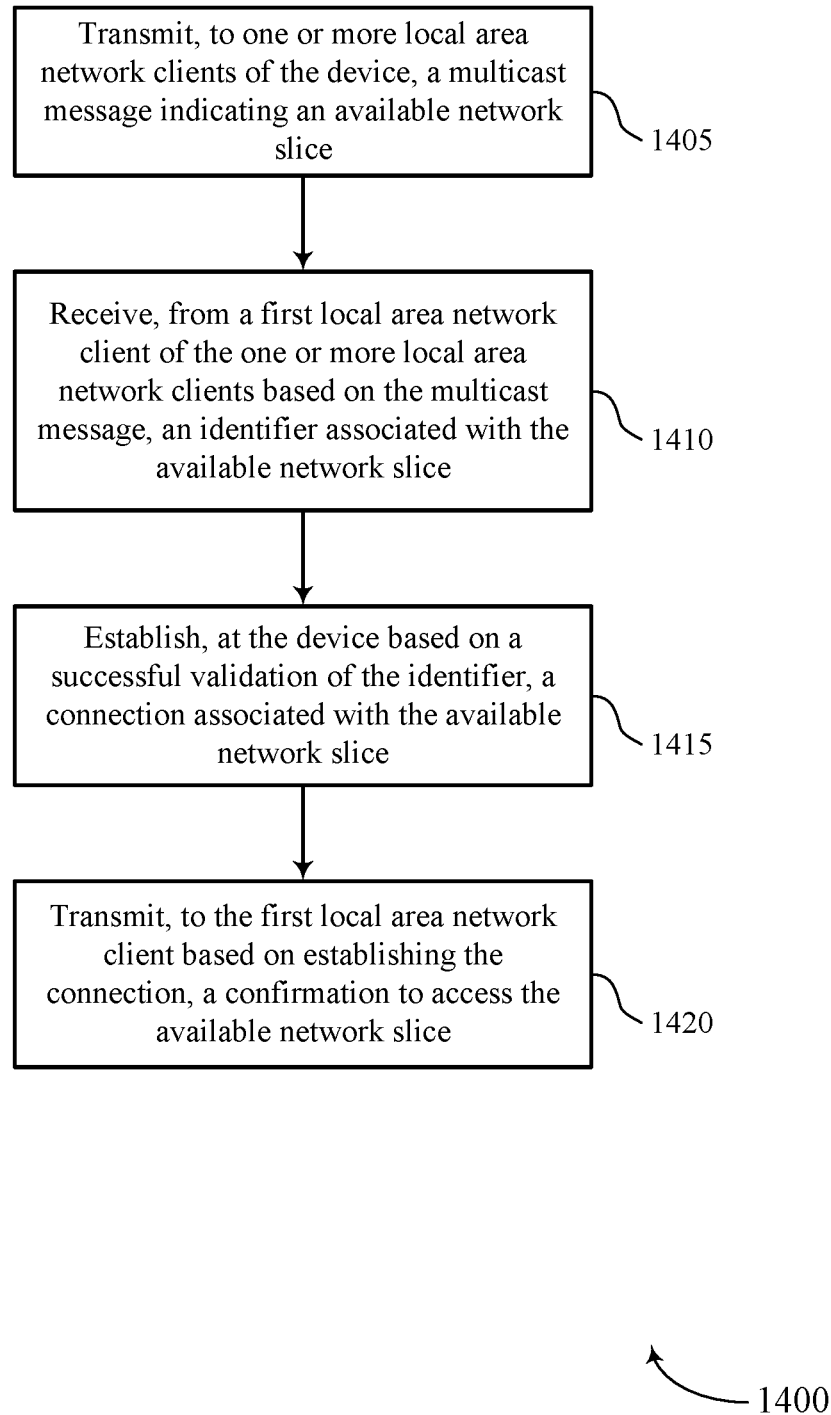
FIG. 14 shows a flowchart illustrating an example process for LAN clients to participate in a network slice according to some implementations.

FIG. 14 shows a flowchart illustrating an example process 1400 for LAN clients to participate in a network slice according to some implementations. The process 1400 may be implemented by a wireless communication device (such as a CPE, or an AP) such as the wireless communication device described above with reference to FIGS. 8-10. In some implementations, the process 1400 begins in block 1405 with transmitting a multicast message. In block 1410, the process 1400 proceeds with receiving an identifier. In block 1415, the process 1400 further proceeds with establishing a connection. In block 1420, the process 1400 further proceeds with transmitting a confirmation to access the available network slice.

In some implementations, transmitting the multicast message in block 1405 includes transmitting, to one or more LAN clients (such as UEs) of the device, the multicast message indicating an available network slice. The operations of 1405 may be performed according to the methods described herein. In some examples, aspects of the operations of 1405 may be performed by a message component as described with reference to FIGS. 8-11.

In some implementations, receiving the identifier in block 1410 includes receiving, from a first LAN client of the one or more LAN clients based on the multicast message, the identifier associated with the available network slice. The operations of 1410 may be performed according to the methods described herein. In some examples, aspects of the operations of 1410 may be performed by an identifier component as described with reference to FIGS. 8-11.

In some implementations, establishing a connection in block 1415 includes establishing, at the device based on a successful validation of the identifier, a connection associated with the available network slice. The operations of 1415 may be performed according to the methods described herein. In some examples, aspects of the operations of 1415 may be performed by a connection establishment component as described with reference to FIGS. 8-11.

In some implementations, transmitting the confirmation to access the available network slice in block 1420 includes transmitting, to the first LAN client based on establishing the connection, the confirmation to access the available network slice. The operations of 1420 may be performed according to the methods described herein. In some examples, aspects of the operations of 1420 may be performed by a confirmation component as described with reference to FIGS. 8-11.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some examples be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication at a device, comprising:
   transmitting, to one or more local area network clients of the device, a multicast message indicating an available network slice;
   receiving, from a first local area network client of the one or more local area network clients based at least in part on the multicast message, a request to access the available network slice;
   establishing, at the device based at least in part on receiving the request, a connection associated with the available network slice, wherein the connection comprises an end-to-end connection between the one or more local area network clients and a second network corresponding to the available network slice; and
   transmitting, to the first local area network client based at least in part on establishing the connection, a confirmation to access the available network slice.

2. The method of claim 1, further comprising:
   determining one or more data packets associated with the available network slice; and
   determining whether the one or more data packets satisfy a quality of service threshold, wherein establishing the connection associated with the available network slice is based at least in part on determining that the one or more data packets satisfy the quality of service threshold.

3. The method of claim 1, further comprising:
   transmitting, to a network device based at least in part on receiving the request, a second request to access the available network slice; and
   receiving, from the network device, a confirmation to access the available network slice, wherein establishing the connection associated with the available network slice is based at least in part on receiving the confirmation from the network device, and wherein the confirmation transmitted to the first local area network client is based at least in part on the confirmation received from the network device.

4. The method of claim 1, further comprising:
   receiving, from the first local area network client, a second request to create a new network slice, wherein the second request is based at least in part on the multicast message;
   determining an approval status associated with the new network slice; and
   transmitting, to a network device based at least in part on determining the approval status, a third request to access the new network slice.

5. The method of claim 4, further comprising receiving, from the network device based at least in part on transmitting the third request, a confirmation to access the new network slice.

6. The method of claim 5, further comprising:
   establishing, at the device based at least in part on receiving the confirmation to access the new network slice, a second connection associated with the new network slice; and
   transmitting, to the first local area network client based at least in part on establishing the second connection, the confirmation to access the new network slice.

7. The method of claim 1, further comprising:
   receiving, from the first local area network client, a second request to delete a second network slice, wherein the second request is based at least in part on the multicast message; and
   deleting the second network slice based at least in part on receiving the second request.

8. The method of claim 1, further comprising:
   receiving, from the first local area network client, a second request to initialize an application using a first wireless area network;
   transmitting, to a network device, the second request to initialize the application of the first local area network client using the first wireless area network; and
   receiving, from the network device, information associated with a plurality of network slices based at least in part on transmitting the second request.

9. The method of claim 8, further comprising determining the available network slice from the plurality of network slices based at least in part on the information, wherein transmitting the multicast message is based at least in part on determining the available network slice.

10. The method of claim 8, wherein the information comprises one or more of network slice selection assistance information, configured slice selection assistance information, or allowed slice selection assistance information.

11. The method of claim 1, further comprising:
    initiating, in response to transmitting the confirmation to access the available network slice, a new communication session with an application provider; and
    determining a quality of service parameter associated with the available network slice based at least in part on initiating the new communication session.

12. The method of claim 11, further comprising:
receiving, from the first local area network client, an indication of a termination of the new communication session associated with the available network slice; and
transmitting, to the first local area network client, a confirmation to terminate the new communication session associated with the available network slice.

13. The method of claim 12, further comprising:
receiving, from the first local area network client, an indication of a released slice based at least in part on transmitting the confirmation to terminate the new communication session, wherein the released slice comprises the available network slice; and
transmitting, to the first local area network client based at least in part on receiving the indication of the released slice, a message indicating a release of one or more resources associated with the released slice.

14. The method of claim 13, further comprising updating the quality of service parameter associated with the available network slice based at least in part on receiving the indication of the released slice.

15. The method of claim 1, wherein the multicast message comprises one or more of a broadcast message, or a universal plug-and-play message.

16. A method for wireless communication at a device, comprising:
transmitting, to one or more local area network clients of the device, a multicast message indicating an available network slice;
receiving, from a first local area network client of the one or more local area network clients based at least in part on the multicast message, an identifier associated with the available network slice;
establishing, at the device based at least in part on a successful validation of the identifier, a connection associated with the available network slice, wherein the connection comprises an end-to-end connection between the one or more local area network clients and a second network corresponding to the available network slice; and
transmitting, to the first local area network client based at least in part on establishing the connection, a confirmation to access the available network slice.

17. The method of claim 16, further comprising:
receiving, from the first local area network client, a request to initialize an application at the first local area network client using a first wireless area network, wherein receiving the identifier is based at least in part on receiving the request; and
determining, in response to receiving the request, whether the identifier associated with the available network slice matches a second identifier, wherein establishing the connection associated with the available network slice is based at least in part on determining that the identifier associated with the available network slice matches the second identifier.

18. The method of claim 16, further comprising:
receiving, from the first local area network client, a request associated with the available network slice, wherein receiving the identifier associated with the available network slice is based at least in part on receiving the request; and
determining, in response to receiving the request, that the request is associated with the available network slice, wherein establishing the connection associated with the available network slice is based at least in part on determining that the request is associated with the available network slice.

19. The method of claim 16, further comprising:
determining one or more data packets associated with the available network slice; and
determining whether the one or more data packets satisfy a quality of service threshold, wherein establishing the connection associated with the available network slice is based at least in part on determining that the one or more data packets satisfy the quality of service threshold.

20. The method of claim 16, further comprising:
transmitting, to a network device based at least in part on receiving the identifier, a request to access the available network slice; and
receiving, from the network device, a confirmation to access the available network slice, wherein establishing the connection associated with the available network slice is based at least in part on receiving the confirmation from the network device, and wherein the confirmation transmitted to the first local area network client is based at least in part on the confirmation received from the network device.

21. The method of claim 16, further comprising:
receiving, from the first local area network client, a request to initialize an application using a first wireless area network;
transmitting, to a network device, the request to initialize the application of the first local area network client using the first wireless area network; and
receiving, from the network device, information associated with a plurality of network slices based at least in part on transmitting the request.

22. The method of claim 21, further comprising determining the available network slice from the plurality of network slices based at least in part on the information, wherein transmitting the multicast message is based at least in part on determining the available network slice.

23. The method of claim 16, further comprising:
initiating, in response to transmitting the confirmation to access the available network slice, a new communication session with an application provider; and
determining a quality of service parameter associated with the available network slice based at least in part on initiating the new communication session.

24. The method of claim 23, further comprising:
receiving, from the first local area network client, an indication of a termination of the new communication session associated with the available network slice; and
transmitting, to the first local area network client, a confirmation to terminate the new communication session associated with the available network slice.

25. The method of claim 24, further comprising:
receiving, from the first local area network client, an indication of a released slice based at least in part on transmitting the confirmation to terminate the new communication session, wherein the released slice comprises the available network slice; and
transmitting, to the first local area network client based at least in part on receiving the indication of the released slice, a message indicating a release of one or more resources associated with the released slice.

26. The method of claim 25, further comprising updating the quality of service parameter associated with the available network slice based at least in part on receiving the indication of the released slice.

27. A wireless communication device comprising:
at least one modem;
at least one processor;
at least one memory communicatively coupled with the at least one processor and storing processor-readable code that, when executed by the at least one processor in conjunction with the at least one modem, is configured to:
  transmit, to one or more local area network clients of the wireless communication device, a multicast message indicating an available network slice;
  receive, from a first local area network client of the one or more local area network clients based at least in part on the multicast message, a request to access the available network slice;
  establish, at the wireless communication device based at least in part on receiving the request, a connection associated with the available network slice, wherein the connection comprises an end-to-end connection between the one or more local area network clients and a second network corresponding to the available network slice; and
  transmit, to the first local area network client based at least in part on establishing the connection, a confirmation to access the available network slice.

28. The wireless communication device of claim 27, wherein the code to determine the distributed resource unit is executable by the processor to cause the wireless communication device to:
  determine one or more data packets associated with the available network slice; and
  determine whether the one or more data packets satisfy a quality of service threshold, wherein establishing the connection associated with the available network slice is based at least in part on determining that the one or more data packets satisfy the quality of service threshold.

29. A wireless communication device comprising:
at least one modem;
at least one processor;
at least one memory communicatively coupled with the at least one processor and storing processor-readable code that, when executed by the at least one processor in conjunction with the at least one modem, is configured to:
  transmit, to one or more local area network clients of the device, a multicast message indicating an available network slice;
  receive, from a first local area network client of the one or more local area network clients based at least in part on the multicast message, an identifier associated with the available network slice;
  establish, at the device based at least in part on a successful validation of the identifier, a connection associated with the available network slice, wherein the connection comprises an end-to-end connection between the one or more local area network clients and a second network corresponding to the available network slice; and
  transmit, to the first local area network client based at least in part on establishing the connection, a confirmation to access the available network slice.

30. The wireless communication device of claim 27, wherein the code to determine the distributed resource unit is executable by the processor to cause the wireless communication device to:
  receive, from the first local area network client, a request to initialize an application at the first local area network client using a first wireless area network, wherein receiving the identifier is based at least in part on receiving the request; and
  determine, in response to receiving the request, whether the identifier associated with the available network slice matches a second identifier, wherein establishing the connection associated with the available network slice is based at least in part on determining that the identifier associated with the available network slice matches the second identifier.

* * * * *